United States Patent
Wang et al.

(10) Patent No.: US 9,118,794 B2
(45) Date of Patent: *Aug. 25, 2015

(54) METHODS, SYSTEMS AND APPARATUS FOR DISPLAYING THE MULTIMEDIA INFORMATION FROM WIRELESS COMMUNICATION NETWORKS

(71) Applicant: Virginia Innovation Sciences, Inc., Alexandria, VA (US)

(72) Inventors: Tiejun Wang, Alexandria, VA (US); William E. Halal, Washington, DC (US); Tiehong Wang, Alexandria, VA (US); Ximing Wang, Beijing (CN)

(73) Assignee: Virginia Innovation Sciences, Inc., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,024

(22) Filed: Nov. 23, 2014

(65) Prior Publication Data

US 2015/0195486 A1 Jul. 9, 2015

Related U.S. Application Data

(63) Continuation of application No. 14/479,568, filed on Sep. 8, 2014, now Pat. No. 8,948,814, which is a continuation of application No. 14/177,396, filed on Feb. 11, 2014, now Pat. No. 8,903,451, which is a (Continued)

(51) Int. Cl.
*H04N 7/01* (2006.01)
*H04N 5/38* (2006.01)

(Continued)

(52) U.S. Cl.
CPC .............. *H04N 7/0125* (2013.01); *H04N 5/38* (2013.01); *H04N 19/44* (2014.11); *H04N 19/85* (2014.11)

(58) Field of Classification Search
CPC ........... H04N 7/01; H04N 5/38; H04N 19/85; H04N 19/44
USPC ................ 455/500, 418, 420, 3.06, 566, 557, 455/556.1, 66.1, 414.1; 375/240.01, 375/240.02, 240.18; 348/14.07, 14.12, 348/384.1, 411

See application file for complete search history.

(56) References Cited

U.S. PATENT DOCUMENTS

| 4,740,963 A | 4/1988 | Eckley |
| 5,610,971 A | 3/1997 | Vandivier |

(Continued)

FOREIGN PATENT DOCUMENTS

| EA | 1429511 | 6/2004 |
| EP | 1076445 | 2/2001 |

(Continued)

OTHER PUBLICATIONS

Notification of Transmittal of the International Search Report and the Written Opinion of the International Searching Authority, or the Declaration; International Application No: PCT/US05/25284; Filing Date: Jul. 15, 2005.

(Continued)

*Primary Examiner* — Brandon Miller

(57) ABSTRACT

Video signals for a mobile terminal are converted to accommodate reproduction by an alternative display terminal. The video signal is processed to provide a converted video signal appropriate for an alternative display terminal that is separate from the mobile terminal. This converted video signal is then provided for the alternative display terminal to accommodate the corresponding video display on a screen provided by the alternative (e.g., external) display terminal.

38 Claims, 7 Drawing Sheets

Related U.S. Application Data continuation of application No. 13/845,171, filed on Mar. 18, 2013, now Pat. No. 8,712,471, which is a continuation of application No. 13/495,890, filed on Jun. 13, 2012, now Pat. No. 8,417,290, which is a continuation of application No. 13/397,156, filed on Feb. 15, 2012, now Pat. No. 8,224,381, which is a continuation of application No. 13/268,001, filed on Oct. 7, 2011, now Pat. No. 8,145,268, which is a continuation of application No. 12/929,408, filed on Jan. 21, 2011, now Pat. No. 8,050,711, which is a continuation of application No. 11/165,341, filed on Jun. 24, 2005, now Pat. No. 7,899,492.

(60) Provisional application No. 60/588,358, filed on Jul. 16, 2004.

(51) Int. Cl.
*H04N 19/85* (2014.01)
*H04N 19/44* (2014.01)

(56) References Cited

U.S. PATENT DOCUMENTS

| | | |
|---|---|---|
| 5,706,290 A | 1/1998 | Shaw |
| 5,745,565 A | 4/1998 | Wakefield |
| 5,784,683 A | 7/1998 | Sistanizadeh |
| 5,880,732 A | 3/1999 | Tryding |
| 5,917,475 A | 6/1999 | Kuzunuki |
| 5,990,882 A | 11/1999 | Heinonen |
| 6,128,509 A | 10/2000 | Veijola et al. |
| 6,181,954 B1 | 1/2001 | Monroe et al. |
| 6,275,333 B1 | 8/2001 | Shaffer |
| 6,349,223 B1 | 2/2002 | Chen |
| 6,349,324 B1 | 2/2002 | Tokoro |
| 6,404,763 B1 | 6/2002 | Renucci et al. |
| 6,452,626 B1 | 9/2002 | Adair |
| 6,484,042 B1 | 11/2002 | Loke |
| 6,546,263 B1 | 4/2003 | Petty et al. |
| 6,555,995 B2 | 4/2003 | Shih |
| 6,593,860 B2 | 7/2003 | Lai |
| 6,594,143 B2 | 7/2003 | Yano |
| 6,628,963 B1 | 9/2003 | Chung |
| 6,690,417 B1 | 2/2004 | Yoshida et al. |
| 6,705,990 B1 | 3/2004 | Gallant |
| 6,718,182 B1 | 4/2004 | Kung |
| 6,763,226 B1 | 7/2004 | McZeal, Jr. |
| 6,781,635 B1 | 8/2004 | Takeda |
| 6,795,715 B1 | 9/2004 | Kubo |
| 6,829,648 B1 | 12/2004 | Jones |
| 6,859,358 B2 | 2/2005 | Baldwin et al. |
| 6,871,243 B2 | 3/2005 | Iwase |
| 6,873,853 B2 | 3/2005 | Kim |
| 6,907,276 B2 | 6/2005 | Toba |
| 6,947,067 B2 | 9/2005 | Halttunen |
| 6,950,624 B2 | 9/2005 | Kim |
| 6,970,127 B2 | 11/2005 | Rakib |
| 7,010,551 B2 | 3/2006 | Terayama |
| 7,023,572 B2 | 4/2006 | Tuli |
| 7,024,601 B2 | 4/2006 | Quinlan |
| 7,027,768 B2 | 4/2006 | Hill |
| 7,076,523 B2 | 7/2006 | Schneider |
| 7,102,591 B2 | 9/2006 | Shih |
| 7,102,691 B2 | 9/2006 | Dischert |
| 7,130,616 B2 | 10/2006 | Janik |
| 7,130,618 B2 | 10/2006 | Yokoyama |
| 7,142,847 B2 | 11/2006 | Umeda |
| 7,202,885 B2 | 4/2007 | Motohashi |
| 7,209,874 B2 | 4/2007 | Salmonsen |
| 7,239,323 B2 | 7/2007 | Park |
| 7,248,888 B2 | 7/2007 | Inselberg |
| 7,257,202 B2 | 8/2007 | Umemura et al. |
| 7,286,651 B1 | 10/2007 | Packingham |
| 7,295,608 B2 | 11/2007 | Reynolds |
| 7,299,009 B2 | 11/2007 | Hussmann |
| 7,312,813 B1 | 12/2007 | Heinonen |
| 7,349,689 B2 | 3/2008 | Chandley |
| 7,360,085 B2 | 4/2008 | Loveria, III |
| 7,377,440 B2 | 5/2008 | Casey |
| 7,426,329 B2 | 9/2008 | Calhoon |
| 7,434,166 B2 | 10/2008 | Acharya |
| 7,480,484 B2 | 1/2009 | Nam |
| 7,490,171 B2 | 2/2009 | Saint-Hilaire |
| 7,505,889 B2 | 3/2009 | Salmonsen |
| 7,574,514 B2 | 8/2009 | Deshpande |
| 7,580,005 B1 | 8/2009 | Palin |
| 7,596,188 B2 | 9/2009 | Gotanda |
| 7,613,893 B2 | 11/2009 | Saint-Hilaire |
| 7,653,344 B1 | 1/2010 | Feldman |
| 7,653,685 B2 | 1/2010 | Serenyi |
| 7,730,223 B1 | 6/2010 | Bavor |
| 7,784,077 B2 | 8/2010 | Fernandez |
| 7,797,242 B2 | 9/2010 | Gautier |
| 7,797,633 B2 | 9/2010 | Flick |
| 7,892,014 B2 | 2/2011 | Amidon |
| 7,899,492 B2 * | 3/2011 | Wang et al. ............... 455/556.1 |
| 7,933,290 B2 | 4/2011 | Aholainen |
| 1,021,268 A1 | 9/2011 | Griffin |
| 8,028,093 B2 | 9/2011 | Karaoguz |
| 8,036,265 B1 | 10/2011 | Reynolds |
| 8,050,711 B2 * | 11/2011 | Wang et al. ............... 455/556.1 |
| 8,131,208 B2 | 3/2012 | Slotznick |
| 8,145,268 B1 * | 3/2012 | Wang et al. ............... 455/556.1 |
| 8,205,235 B2 | 6/2012 | Hlasney |
| 8,224,381 B1 * | 7/2012 | Wang et al. ............... 455/556.1 |
| 8,417,290 B2 * | 4/2013 | Wang et al. ............... 455/556.1 |
| 8,707,373 B2 | 4/2014 | Lee |
| 8,712,471 B2 * | 4/2014 | Wang et al. ............... 455/556.1 |
| 8,903,451 B2 * | 12/2014 | Wang et al. ............... 455/556.1 |
| 8,948,814 B1 * | 2/2015 | Wang et al. ............... 455/556.1 |
| 2001/0021998 A1 | 9/2001 | Margulis |
| 2001/0047517 A1 | 11/2001 | Christopoulos |
| 2002/0057265 A1 | 5/2002 | Tamura |
| 2002/0066115 A1 | 5/2002 | Wendelrup |
| 2002/0078149 A1 | 6/2002 | Chang |
| 2002/0089589 A1 | 7/2002 | Adair |
| 2002/0090980 A1 | 7/2002 | Wilcox et al. |
| 2002/0094826 A1 | 7/2002 | Lee |
| 2002/0094845 A1 | 7/2002 | Inasaka |
| 2002/0100063 A1 | 7/2002 | Herigstad |
| 2002/0102998 A1 | 8/2002 | Lin |
| 2002/0118762 A1 | 8/2002 | Shakiba |
| 2002/0119800 A1 | 8/2002 | Jaggers |
| 2002/0137505 A1 | 9/2002 | Eiche et al. |
| 2002/0137551 A1 | 9/2002 | Toba |
| 2002/0157112 A1 | 10/2002 | Kuhn |
| 2003/0017846 A1 | 1/2003 | Estevez |
| 2003/0027517 A1 | 2/2003 | Callway |
| 2003/0054794 A1 | 3/2003 | Zhang |
| 2003/0104806 A1 | 6/2003 | Ruef et al. |
| 2003/0106067 A1 | 6/2003 | Hoskins |
| 2003/0126293 A1 | 7/2003 | Bushey |
| 2003/0128197 A1 | 7/2003 | Turner |
| 2003/0130009 A1 | 7/2003 | Kung |
| 2003/0137609 A1 | 7/2003 | Hayakawa |
| 2003/0226149 A1 | 12/2003 | Chun |
| 2003/0229900 A1 | 12/2003 | Reisman |
| 2004/0046783 A1 | 3/2004 | Montebovi |
| 2004/0049797 A1 | 3/2004 | Salmonsen |
| 2004/0056985 A1 | 3/2004 | Scong |
| 2004/0057199 A1 | 3/2004 | Azuchi |
| 2004/0063456 A1 | 4/2004 | Griffin |
| 2004/0090466 A1 | 5/2004 | Loveria |
| 2004/0098463 A1 | 5/2004 | Shen |
| 2004/0125136 A1 | 7/2004 | Wallenius |
| 2004/0142724 A1 | 7/2004 | Buttet |
| 2004/0150713 A1 | 8/2004 | Cheng |
| 2004/0157642 A1 | 8/2004 | Lee et al. |
| 2004/0177376 A1 | 9/2004 | Caspi et al. |
| 2004/0203374 A1 | 10/2004 | Zilliacus |
| 2004/0204151 A1 | 10/2004 | Muthuswamy |
| 2004/0207719 A1 | 10/2004 | Tervo |
| 2004/0212731 A1 | 10/2004 | Sie et al. |

(56) References Cited

U.S. PATENT DOCUMENTS

| | | |
|---|---|---|
| 2004/0223614 A1 | 11/2004 | Seaman |
| 2004/0252965 A1 | 12/2004 | Moreno |
| 2004/0268408 A1 | 12/2004 | Lee |
| 2005/0036509 A1 | 2/2005 | Acharya et al. |
| 2005/0085183 A1 | 4/2005 | Lee |
| 2005/0088463 A1 | 4/2005 | Schilling |
| 2005/0101343 A1 | 5/2005 | Hsiao |
| 2005/0125082 A1 | 6/2005 | Hanson |
| 2005/0136972 A1 | 6/2005 | Smith |
| 2005/0144641 A1 | 6/2005 | Lewis |
| 2005/0188407 A1 | 8/2005 | van Beek |
| 2005/0235048 A1 | 10/2005 | Costa-Requena |
| 2005/0264704 A1 | 12/2005 | Leinonen |
| 2005/0289631 A1 | 12/2005 | Shoemake |
| 2006/0001737 A1 | 1/2006 | Dawson et al. |
| 2006/0074810 A1 | 4/2006 | Verberkt |
| 2006/0112414 A1 | 5/2006 | Ikonen |
| 2006/0164550 A1 | 7/2006 | Yoshimoto |
| 2006/0218482 A1 | 9/2006 | Ralston |
| 2007/0218837 A1 | 9/2007 | Lessing |
| 2007/0287498 A1 | 12/2007 | Wang et al. |
| 2009/0225863 A1 | 9/2009 | Perlman |
| 2011/0212687 A1 | 9/2011 | Foster |

FOREIGN PATENT DOCUMENTS

| | | |
|---|---|---|
| EP | 1307062 | 5/2003 |
| GB | 2364478 | 1/2002 |
| GB | 2383728 | 7/2003 |
| JP | H6-113235 | 4/1994 |
| JP | 1999-284757 | 10/1999 |
| JP | 2001-352373 A | 12/2001 |
| JP | 2002-101457 | 4/2002 |
| JP | 2002-108736 | 4/2002 |
| JP | 2002-101457 | 12/2002 |
| JP | 2002-359670 | 12/2002 |
| JP | 2003-023548 | 1/2003 |
| JP | 2003-061163 | 2/2003 |
| JP | 2003-198960 | 7/2003 |
| JP | 2003-339041 | 11/2003 |
| JP | 2004-064734 | 2/2004 |
| KR | 2002-0014251 | 2/2002 |
| KR | 10-2004-0027996 | 4/2004 |
| WO | WO-99-57900 | 11/1999 |
| WO | WO-01-28235 | 4/2001 |
| WO | WO-01-56297 | 8/2001 |
| WO | WO-02-32074 | 4/2002 |
| WO | WO-02/45424 | 6/2002 |
| WO | WO-02-101457 | 12/2002 |
| WO | WO-03/077550 | 9/2003 |
| WO | WO-03-087961 | 10/2003 |

OTHER PUBLICATIONS

Digital Display Working Group, Digital Video Interface (DVI) Spec. Rev. 1.0 (Apr. 2, 1999).
Wireless Application Protocol Forum, WAP MMS Client Transactions Version 12 (Jun. 12, 2001).
Notification of Transmittal of the International Search Report and the Written Opinion of the International Searching Authority, or the Declaration; International Application No. PCT/US05/25284; Filing Date: Jul. 15, 2005.
A. Bertella, et al., Mobile DVB-T Reception Quality of Streaming over IP of Audiovisual Services (Jun. 18, 2003).
Amoolya Singh et al., Performance Evaluation of UDP Lite for Cellular Video (Jun. 26, 2001).
Consumer Electronics Association, CES 2004, 5 Technologies to Watch, Special Supplement to CE Vision Magazine (2004).
N. Gerfelder, H. Jung, L.M. Santos, C. Belz, Challenges to Deliver 2D/3D Content for Multimedia Applications in Mobile Environments, ACTS Mobile Communications Summit 1998, Rhodos (1998).
Panasonic CES 2004 Keynote Presentation (Jan. 8, 2004).
Patrick Barwise, TV, PC, or Mobile? Future Media for Consumer e-Commerce, Business Strategy Review v12, issue 1 (2001).
Mandayam Raghunath, et al., Fostering A Symbiotic Handheld Environment, IEEE 0018-9162/03 (Sep. 2003).
Microsoft Press Release, Microsoft Unveils New Home PC Experiences With Freestyle and Mira (Jan. 7, 2002).
Francisco J. Gonzáles-Castaño et al., QoS Provisioning in Mobile Video Services with Satellite Sources, Proceedings of 2nd Int'l Workshop of Cost Actions (2003), at 55-59.
Emilia Bielli, et al., A Wireless Health Outcomes Monitoring System (WHOMS): development and field testing with cancer patients using mobile phones (Jun. 15, 2004).
Digital Entertainment in the Home, The Home Computer & Connectivity, Parks Associates (2004).
Derek Ball, Barry Shilmover, How to Do Everything With Your iPAQ Pocket PC (Second Ed. 2003).
Richard Han, et al., WebSplitter: A Unified XML Framework for Multi-Device Collaborative Web Browsing, CSCW (Dec. 2, 2000) ("Han, WebSplitter").
Takayuki Warabino, Video Transcoding Proxy for 3G wireless Mobile Internet Access, IEEE 0163-6804/00 (2000) ("Warabino").
Teresa H. Meng, Portable video-on-demand in wireless communication, 0018-9219/95 (Apr. 1995) ("Meng, Portable Video-On-Demand").
Thai-Lai Pham, Georg Schneider, Stuart Goose, Arturo Pizano, Siemens Corporate Research, Composite Device Computing Environment: A Framework for Augmenting the PDA Using Surrounding Resources (Jun. 2000) ("Pham, Composite Device Computing Environment").
Thai-Lai Pham, Georg Schneider, and Stuart Goose, Siemens Corporate Research, Exploiting Location-Based Composite Devices to Support and Facilitate Situated Ubiquitous Computing (2000).
Thomas E. Truman, et al., The InfoPad Multimedia Terminal: A Portable Device for Wireless Information Access, 47 IEEE Transactions on Computers 10 (Oct. 1998) ("Truman").
Yamauchi, A 1440X1080 Pixels 30 Frames/s Motion-JPEG2000 Codec for HD Movie Transmission, IEEE 0-7803-8267-6/04 (2004).
Wai Yip Lum, A Context-Aware Decision Engine for Content Adaptation, Pervasive Computing, IEEE 1536-1268/02 (Sep. 2002) ("Lum, Decision Engine for Content Adaptation").
Xueyan Tang et al., Streaming Media Caching Algorithms for Transcoding Proxies, Proceeding of the Int'l Conference on Parallel Processing (ICPP '02), 0-7695-1677-7/02 (2002).
Ralf Schäfer et al., MPEG-4 Transmission Over Wireless Networks, Proceeding of 9th European Signal Processing Conference (EUSIPCO) (Sep. 1998), at 245-248.
Stephan Hartwig et al., Mobile Multimedia—Challenges and Opportunities, 46 IEEE Transactions on Consumer Electronics 4 (Nov. 2000), at 1167-1178.
Bluetooth protocol, including the protocol itself as well as all evidence of its contents, adoption, and implementation, including but not limited to the following: The Official Bluetooth Website (Aug. 1, 2003), Blueteooth SIG, Inc.—Public Specifications (Dec. 4, 2002), Nokia, Bluetooth Technology Overview v1.0 (Apr. 4, 2003), Specification of the Bluetooth System v1.1, vol. 1, Core (Feb. 22, 2001), Specification of the Bluetooth System v1.2, vol. 0, Master Table of Content & Compliance Requirements (Nov. 5, 2003), Laura Rohde, Ericsson Demos Frist Bluetooth Phone, CNN.com (Jun. 8, 2000). Products implementing the Bluetooth protocol, including those described in other references in this response.
Digital Living Network Alliance v1.0 protocol ("DLNA"), including the protocol itself as well as all evidence of its contents, adoption, and implementation, including but not limited to the following: U.S. Pat. No. 7,574,514 to Deshpande ("Deshpande '514"), Glen Stone, Prabir Mohanty, Paul Sorenson, Intel Developer Forum, DHWG HNv1 and Use Case Subcommittee Update (Feb. 2004) ("IDF 2004 DLNA Presentation"), Scott Smyers, Digital Living Network Alliance: Networking for Everyman (Oct. 2004), Alexander Grundner, New Details: DLNA Home Networked Device Interoperability Guidelines 1.0, The Pulse (Jun. 24, 2004), BroadBand Watch, CEATEC Japan 2004 (Oct. 10, 2004), Tony Smith, Digital Home Group Touts Convergence Spec, The Register (Jun. 23, 2004), Martyn Williams, Gadgets Getting Connected with DLNA, ARN, ComputerWorld (Oct. 14,

(56) References Cited

OTHER PUBLICATIONS

2004), DHWG, Mobile Handheld Sub-Committee, Mobile Use Cases Passed for HNv1 (Oct. 18, 2003), Use Case Proposals (Sep. 3, 2003), Glen Stone, CEA R7.7 Wireless Entertainment Networking (Aug. 5, 2003).
Digital Living Network Alliance v1.0 protocol ("DLNA"), including the protocol itself as well as all evidence of its contents, adoption, and implementation, including but not limited to the following: DLNA, Home Networked Device Interoperability Guidelines (2004) ("DLNA v1.0"), DLNA, Digital Home White Paper, Final Version (Jun. 2003) ("Digital Home White Paper"), DLNA, Sharing Digital Content in the Home: Introducing the Digital Home Working Group, Press Presentation (San Fran., CA) (Jun. 24, 2003) ("Sharing Digital Content"), DLNA, Sharing Digital Content in the Home: Introducing the Digital Home Working Group, Press Presentation (Tokyo, Japan) (Scott Smyers) (Oct. 7, 2003), DLNA, Sharing Digital Content in the Home: Introducing the Digital Home Working Group, Press Presentation (Dusseldorf) (Glen Stone) (Oct. 23, 2003), DHWG Status to CEA (Long Beach, CA) (Glen Stone) (Nov. 11, 2003), DLNA, Sharing Digital Content in the Home: Jan. 2004 Update (Jan. 2004), DLNA, Overview and Vision White Paper (Jun. 2004) ("Overview and Vision"), DLNA, Use Case Scenarios White Paper (Jun. 2004) ("Use Case") DLNA, DLNA Press Release, DLNA Strides Toward Consumer-Friendly Home Networked Devices with New Interoperability Guidelines (Jun. 22, 2004), DLNA, 17 Leading Companies Form Working Group to Simplify Sharing of Digital Content Among Consumer Electronics, PCs, and Mobile Devices (Jun. 24, 2003), Will Lumpkins, Texas Instruments, Digital Living Network Alliance Presentation (2004) ("Lumpkins TI"), Associated Press, Tech Firms Form Alliance to Boost Home Networking, LA Times (Jun. 25, 2003), Broadband Home Report (Jan. 22, 2004).
Products implementing the DLNA v1.0 protocol, including those described in other references in this response.
Digital Living Network Alliance expanded Mar. 2006 protocol ("DLNA expanded Mar. 2006"), including the protocol itself as well as all evidence of its contents, adoption, and implementation, including but not limited to the following: DLNA, DLNA Networked Device Interoperability Guidelines (expanded Mar. 2006), Products implementing the DLNA expanded Mar. 2006 protocol, including those described in other references in this response Digital Entertainment Network Initiative, including the protocol itself as well as all evidence of its contents, adoption, and implementation, including but not limited to the following: U.S. Pat. No. 7,574,514 to Deshpande ("Deshpande '514"), DENi Architecture v0.03, R7.5 WG1 Standards Group (Draft CEA-#TBD) (Sep. 3, 2003) ("DENi v0.03") (from file history of Deshpande '514), Products implementing the DLNA expanded Mar. 2006 protocol, including those described in other references in this response Digital Entertainment Network Initiative, including the protocol itself as well as all evidence of its contents, adoption, and implementation, including but not limited to the following: U.S. Pat. No. 7,574,514 to Deshpande ("Deshpande '514"), DENi Architecture v0.03, R7.5 WG1 Standards Group (Draft CEA-#TBD) (Sep. 3, 2003) ("DENi v0.03") (from file history of Deshpande '514), Toby Nixon, UPnP Forum State of the Union, UPnP Forum (Sep. 30, 2003), Broadband Home Report (Jan. 22, 2004), CEA Adopts DENi Standard (Jul. 30, 2003), Digital Home Networking Standard (Aug. 3, 2003), Products implementing the Digital Entertainment Network Initiative protocol, including those described in other references in this response.
The High-Definition Multimedia Interface protocol ("HDMI"), including the protocol itself as well as all evidence of its contents, adoption, and implementation, including but not limited to the following: High-Definition Multimedia Interface Specification, Informational Version 1.0 (Sep. 4, 2003), High-Definition Multimedia Interface Specification, Informational Version 1.1 (May 20, 2004), U.S. Pat. No. 2004/0223614 to Seaman ("Seaman '614"), Anush Yegyazarian, TVs of the Future: Flat and Huge, PC World (Jan. 27, 2004), Crutchfield Catalog (Summer 2004), HDMI Press Release, Toshiba Enters HDMI Semiconductor Market (Dec. 15, 2003), HDMI Press Release, JAE Introduces the DC1 Series, A New Connector Designed for HDMI (Sep. 24, 2003), HDMI Press Release, First HDMI CE Products Hit the Market—All Using Panelink Cinema (Sep. 5, 2003), HDMI Press Release, HDMI Connectors from Molex Provide HD Digital Link for Consumer Electronics Equipment (Jul. 25, 2003), HDMI Press Release, Silicon Image Opens HDMI Authorized Testing Center (Jun. 26, 2003), HDMI Press Release, Silicon Image Showcases HDMI Products From JVC, Meridian, Panasonic and Samsung (Jan. 9, 2003), HDMI Press Release, Silicon Image Sets the Standard for Digital Consumer Electronics Interfaces with PanelLink Cinema, The World's First HDMI Transmitter and Receiver (Jan. 9, 2003), Meridian 800 is World's First HDMI DVD-Audio/Video Player (Jan. 9, 2003), Meridian, G91 DVD Audio Player Controller Tuner, No. G91DS v3.1.4.11.03 RE (2003), Meridian, G98 DVD Audio Transport, No. G98DS v3.1, 4.11.03 RE (2003), Toshiba Press Release, Toshiba Enters HDMI Semiconductor Market with HDMI Receiver and Transmitter ICS (Dec. 15, 2003).
Products implementing the HDMI protocol, including those described in other references in this response.
Universal Plug & Play ("UPnP") protocol, including the protocol itself as well as all evidence of its contents, adoption, and implementation, including but not limited to the following: Universal Plug & Play, Connections vol. 3 (2001 Q1) ("Connections 2001 01"), Universal Plug & Play, Connections vol. 4 (2001 Q2) ("Connections 2001 Q2"), Universal Plug & Play, Connections vol. 5 (2001 Q4) ("Connections 2001 Q4"), Universal Plug & Play, Connections (2002 Q2), Universal Plug & Play, Connections (2002 Q3) ("Connections 2002 Q3"), UPnP, Networking Made Easy, PC Magazine (Sep. 16, 2003) ("Networking Made Easy"), Microsoft Windows Me Millennium Edition: Understanding Universal Plug and Play, White Paper (Jun. 2000) ("MS Windows White Paper"), S.K. Tso, An Intelligent Networking and Automation System for Home and SOHO Environments (Jun. 10-12, 2003), IEEE 0-7803-7777-X/03 ("Tso"), Hanford Choy and Axel Fuchs, Developing Innovative Devices Using Universal Plug and Play (UPnP), SimpleDevices (2004) ("Innovative UPnP SimpleDevices"), Michael Jeronimo, It Just Works: UPnP in the Digital Home, The Journal of Spontaneous Networking (Oct. 5, 2004) ("UPnP It Just Works"), G. Schneider, C. Hoymann, S. Goose, Siemens Corporate Research, Adhoc Personal Ubiquitous Multimedia Services via UPnP (2001), IEEE 0-7695-1198-8/01 ("Schneider"), Intel, Designing a UPnP AV MediaServer v1.00 (Jul. 31, 2003) ("Intel UPnP MediaServer v1.00"), Intel, Overview of UPnP AV Architecture v1.00 (Jul. 2, 2003) ("Intel UPnP AV Architecture v1.00"), Internet Archive, Intel Software for UPnP Technology (Jun. 20, 2004) ("Intel UPnP Software"), Michael Jeronimo and Jack Weast, UPnP Design by Example, Intel Press (Apr. 2003), including the accompanying CD-ROM ("Jeronimo, Design by Example"), Intel Technical Journal, vol. 6, Issue 4 (Nov. 15, 2002) ("Intel Tech. Journal v6"), CyberLink Press Release, CyberLink Reveals UPnP-Compliant Home Entertainment Applications, PowerCinema, at Intel Developer Forum (Apr. 12, 2004), Michael Jeronimo and Jack Weast, Intel Universal Plug & Play—The Foundation of the Digital Home (Jun. 4, 2003) ("UPnP Foundation"), U.S. Pat. No. 7,574,514 to Deshpande ("Deshpande '514"), Universal Plug and Play Device Architecture v1.0 (Jun. 8, 2000) (from file history of Deshpande '514), Toby Nixon, UPnP Forum State of the Union, UPnP Forum (Sep. 30, 2003).
Products implementing the UPnP protocol, including those described in other references in this response.
802.11, including the protocols themselves as well as all evidence of their contents, adoption, and implementation, including but not limited to the following: Wireless LAN Medium Access Control (MAC) and Physical Layer (PHY) Specifications, ANSI/IEEE Std. 802.11, 1999 Edition, IEEE Computer Society, LAN/MAN Standards Committee (Aug. 20, 1999).
Products implementing the DLNA expanded Mar. 2006 protocol, including those described in other references in this response Wireless (e.g., 802.11) and cellular-equipped (e.g., EVDO, EDGE, 3G) PCMCIA and Compact Flash cards and USB dongles, including the products themselves, those described in other references in this response, as well as all evidence of their release, operation, and functionality, including but not limited to the following: Linksys

(56) References Cited

OTHER PUBLICATIONS

WCF11 Instant Wireless Network CF Card (Oct. 7, 2003), Linksys WCF12 Wireless CompactFlash Card (Oct. 7, 2003), Sprint User's Guide, PCS Connection Card, Model: CF2031 (2002), Toshiba Pocket PC Insert for PCS Connection Card CF2031 by Growell and Sprint, No. TOP2031-01 (2003) ("PCS CF2031 Connection Card"), PCS Connection Card CF2031, FAQ and Issues (Oct. 8, 2003), Internet Archive, CF2031 PCS Connection Card by Growell (Nov. 19, 2003).
Actiontec Wireless Digital Media Player, including the product itself as well as all evidence of its release, operation, and functionality.
Apple Airport Express product, including the product itself as well as all evidence of its release, operation, and functionality, including but not limited to the following: Apple Pumps Music Through Air, WIRED Magazine (Jun. 7, 2004).
Denon NS-S100 Network Multimedia Server, including the product itself as well as all evidence of its release, operation, and functionality, including but not limited to the following: Internet Archive, TechTV's Best of CES 2004 Winners (Apr. 2, 2004), Broadband Home Report (Jan. 22, 2004), Popular Science (Mar. 2004).
Digital 5 Netplay Family products, including the products themselves as well as all evidence of their release, operation, and functionality, including but not limited to the following: D2730 Networked DVD Player to Begin Shipping Throughout the U.S. on Jul. 14 (Oct. 10, 2003), Digital 5 Announces the Future of Streaming Multimedia Connectivity with Netmedia (Jan. 4, 2002), Digital 5, Netplay AV (Jun. 10, 2003), o Digital 5, Netplay Family (Jun. 2003), o Digital 5, Netplay DVD (Jun. 2003), Digital 5 to Support Intel NMPR Development Guidelines (Apr. 22, 2004).
D-Link DSM-320 Wireless Media Player ("D-Link DSM-320"), including the product itself as well as all evidence of its release, operation, and functionality, including but not limited to the following: Internet Archive, D-Link, DSM-320 MediaLounge High Speed 2.4 GHz (802.11g) Wireless Media Player (Jun. 4, 2004), Internet Archive, D-Link, DSM-320 MediaLounge High Speed 2.4 GHz (802.11g) Wireless Media Player, Diagram (Jun. 4, 2004), Internet Archive, D-Link, DSM-320 MediaLounge High Speed 2.4 GHz (802.11g) Wireless Media Player, Specifications (Jun. 4, 2004), Internet Archive, D-Link, DSM-320 MediaLounge High Speed 2.4 GHz (802.11g) Wireless Media Player, Photo, Music, Video (Jun. 4, 2004), Internet Archive, D-Link, DSM-320 MediaLounge High Speed 2.4 GHz (802.11g) Wireless Media Player, Product Features and Product Description (Jun. 5, 2004), D-Link Media Lounge is Now Streaming, PC Magazine (Nov. 16, 2004) ("D-Link Now Streaming"), MediaLounge Entertainment Network D-Link DSM-320 Wireless Media Player Manual v1.0 (2002) ("DSM-320 v1.0 Manual").
Elgato EyeHome, including the product itself as well as all evidence of its release, operation, and functionality, including but not limited to the following: Elgato EyeHome Review, Macworld (Jul. 2004), o Internet Archive, Elgato EyeHome (Jul. 1, 2004), o Internet Archive, Elgato EyeHome Review (Mar. 4, 2004).
HDTV, including the protocol itself as well as all evidence of its contents, adoption, and implementation, including but not limited to the following: Congresssional Budget Office, Completing the Transition to Digital Television (Sep. 1999), FCC Advisory Committee on Advanced Television Service, Final Report (Nov. 28, 1995), FCC Advisory Committee on Advanced Television Service, Final Technical Report (Oct. 31, 1995), The US HDTV Standard, The Grand, IEEE Spectrum 0018-9235/95 (Apr. 1995).
Hewlett-Packard Pocket PC and iPAQ devices, including the products themselves as well as all evidence of their release, operation, and functionality, including but not limited to the following: Compaq iPAQ Pocket PC H3600 Series, QuickSpecs version 22 (Aug. 8, 2002), Compaq iPAQ Pocket PC H3800 Series, QuickSpecs version 14 (May 16, 2002), Compaq iPAW Pocket PC H3800 Series, Reference Guide, First Edition (Sep. 2001).
Hewlett-Packard Digital Media Receiver 5000, including the product itself as well as all evidence of its release, operation, and functionality, including but not limited to the following: HP Wireless Digital Media Receiver ew5000, PC Magazine (Jul. 1, 2003).
Hewlett-Packard x5400 Media Center Extender ("HP Media Center x5400"), including the product itself as well as all evidence of its release, operation, and functionality, including but not limited to the following: Sharing Pictures, Music, and Videos on Windows Media Center Extender (2004) ("x5400, Sharing Videos"), HP Media Center Extender, Networking, 5991-1345 (2004), HP Media Center Extender Quick Start Guide, 5991-1355 (2004) ("x5400 QSG"), HP Media Center Extender, User's Guide/Warranty and Support Guide, 5991-1356 (2004) ("x5400 User Guide"), Forward Thinking, Microsoft's Growing Family, PC Magazine ("Forward Thinking") (Nov. 16, 2004), A Near-Perfect Add-On, PC Magazine (Nov. 16, 2004) ("Near-Perfect Add-On"), HP Media Center Extender x5400 Fact Sheet (Dec. 13, 2005) ("x5400 Fact Sheet"), HP x5400 Media Center Extender Datasheet (Jan. 8, 2006) ("x5400 Datasheet").
iCube Play@TV, including the product itself as well as all evidence of its release, operation, and functionality.
IA Style Inc. software, including IA Style Presentation Pack, IA Presenter, and IA Screen Mirror, including the software itself as well as all evidence of its release, operation, functionality, and implementation on devices, including but not limited to the following: Internet Archive, IA Presenter, HPC.net (Jun. 9, 2003), IAPresenter201EN.zip from Internet Archive, IA Presenter, HPC.net (Jun. 9, 2003), IA Style Software Will Be Bundled With ATI's IMAGEON 100, PocketNow.com (Jul. 3, 2002), Leigh Geary, IA Style Moves Home, Cool Smartphone (Jan. 16, 2004).
Products implementing the IA Style Inc. software, including those referenced elsewhere in this reponse.
Intel Networked Media Product Requirements ("Intel NMPR"), including the protocol itself as well as all evidence of its contents, adoption, and implementation, including but not limited to the following: Michael Jeronimo, It Just Works: UPnP in the Digital Home, The Journal of Spontaneous Networking (Oct. 5, 2004) ("UPnP It Just Works"), CyberLink Press Release, CyberLink Reveals UPnP-Compliant Home Entertainment Applications, PowerCinema, at Intel Developer Forum (Apr. 12, 2004), Internet Archive, Mediabolic, First Digital Home Compliant Product Now Commercially Available From Mediabolic (Feb. 17, 2004) ("Mediabolic NMPR"), U.S. Pat. No. 7,613,893 to Saint-Hilaire, Intel, Designing a UPnP AV MediaServer v1.00 (Jul. 31, 2003) ("Intel UPnP MediaServer v1.00"), Intel, Overview of UPnP AV Architecture v1.00 (Jul. 2, 2003) ("Intel UPnP AV Architecture v1.00"), Internet Archive, Intel Software for UPnP Technology (Jun. 20, 2004) ("Intel UPnP Sotware"), Michael Jeronimo and Jack Weast, UPnP Design by Example, Intel Press (Apr. 2003), including the accompanying CD-ROM ("Jeronimo, Design by Example"), Intel Technical Journal, vol. 6, Issue 4 (Nov. 15, 2002) ("Intel Tech. Journal v6"), Michael Jeronimo and Jack Weast, Intel Universal Plug & Play—The Foundation of the Digital Home (Jun. 4, 2003) ("UPnP Foundation"), Intel Technical Briefing, Building Digital Media Adapters to Extend the PC (2002) ("Intel Building Digital Media Adapter"), Intel Building Blocks for Digital Home Solutions (Sep. 19, 2003) ("Intel Building Blocks"), Product Brief, Intel Vision for the Digital Home (Sep. 19, 2003), Intel, Digital Home FAQs—PC Platform (Jul. 3, 2003), Intel, Digital Home FAQs—General (Jul. 3, 2003), Intel News Release, Intel's Digital Home Vision Moves Closer to Reality with New Industry Enabling Building Blocks (Feb. 19, 2003), Intel, Research Shows the Digital Home is Taking Off and the PC is Ready to Distribute Media Throughout the Home (Jul. 4, 2003), ("Digital Home Intelligent Centers"), Intel Product Brief, The Path to Interoperability in the Digital Home (Jul. 3, 2003) ("Path to Interoperability"), Internet Archive, Frequently Asked Questions about Intel®Developer Network for the Digital Home (Oct. 5, 2003) ("Developer Network FAQs"), Intel, Industry Leaders Develop First Standards-Based Products Enabling Premium Content for The Digital Home (Sep. 8, 2004).
iRiver iMP-1100, including the product itself as well as all evidence of its release, operation, and functionality.
Lifeview FlyJacket and/or FlyPresenter, including the products and/or softwareas well as all evidence of their release, operation, and functionality, including but not limited to the following: Internet Archive, Lifeview.com FlyPresenter-CF (Aug. 12, 2003), Internet

(56) References Cited

OTHER PUBLICATIONS

Archive, Tong Zhang, Presentation Cards for Your Pocket PC, MobileTechReview (Jun. 2003), U.S. Pat. No. 6,555,995 to Shih ("Shih '995"), U.S. Pat. No. 7,102,591 to Shih ("Shih '591"), LifeView Video-Out Video (Aug. 8, 2003), Internet Archive, FlyJacket i3800 Key Features (Apr. 15, 2003), FlyJacket i3800 User's Guide v1.1 (Dec. 2001) ("FlyJacket v1.1").
Linksys, WPG-54G Wireless G Presentation Player ("Linksys WPG-54G"), including the product itself as well as all evidence of its release, operation, and functionality, including but not limited to the following: Linksys, WPG54G Product Data, WPG54G-DS-40218NC-BW (2004), ("Linksys Data Sheet"), Linksys, WPG54G User Guide, wpg54g-ug-31224NCBW (2004) ("Linksys User Guide"), Linksys, WPG54G Quick Installation (2003) ("Linksys Quick Installation Guide"), Internet Archive, Wireless-G Presentation Player (Jun. 12, 2004) ("Linksys WPG54G Website"), Broadband Home Report (Jan. 22, 2004), Internet Archive, Intel Connecting Consumers in the Digital Home (Oct. 3, 2003).
Margi Presenter-to-Go Modules and Cards, including the products themselves as well as all evidence of their release, operation, and functionality, including but not limited to the following: Margi, Presenter-to-Go Documentation (Oct. 11, 2003), Margi, Presenter-to-Go Feature Comparison (Oct. 4, 2003), Margi Presenter-to-Go Springboard Module for Handspring Visor Handhelds (Jun. 19, 2001), Margi Presenter-to-Go CompactFlash Card (Oct. 28, 2002), Margi Presenter-to-Go Secure Digital Card (Aug. 1, 2002), Margi Presenter-to-Go for Memory Stick (Sep. 6, 2002), Presenter-to-Go Secure Digital (SD) & Memory Stick (MS) User's Guide (2002), Presenter-to-Go Springboard Module User's Guide (2001), Presenter-to-Go PC Card & CF Card User's Guide (2001), Presenter-to-Go, Quick Start Tutorial (2001), Presenter-to-Go, Quick Start Tutorials (2002), Margi Systems Brings Wireless Functionality to New Line of HP Digital Projectors (Sep. 23, 2003).
Mediabolic One, including the product itself as well as all evidence of its release, operation, and functionality, including but not limited to the following: Internet Archive, Mediabolic Networked A/V Receiver (Apr. 22, 2004) ("Networked A/V Receiver"), Internet Archive, Mediabolic CES 2004 Photo Gallery (Apr. 1, 2004), Jeremy Toeman, Mediabolic, The Future of Home Entertainment, Connections 2001 Q4, Internet Archive, Mediabolic, Products (Dec. 4, 2003) ("Mediabolic Products"), Internet Archive, Mediabolic, Middleware (Oct. 2, 2003) ("Mediabolic Specifications"), Internet Archive, Mediabolic, Sample Products (Dec. 4, 2003) ("Mediabolic Sample Products"), Internet Archive, Mediabolic, Portable Media Player (Dec. 4, 2003), ("Mediabolic PMP"), Internet Archive, Mediabolic, Media Player (Oct. 2, 2003) ("Mediabolic Media Player"), Internet Archive, Mediabolic, Enhanced DVD (Oct. 2, 2003) ("Mediabolic Enhanced DVD"), Internet Archive, Mediabolic, MbOS (Oct. 2, 2003) ("Mediabolic MbOS"), Internet Archive, Mediabolic, Communications (Oct. 2, 2003) ("Mediabolic Communications"), Internet Archive, Press Release, Mediabolic Announces Support for Universal Plug and Play (UPnP) to Enable Networked Entertainment Products (Nov. 6, 2001) ("Mediabolic UPnP"), Internet Archive, Reuters, All-In-One Living Room Gadgets Arrive (Apr. 18, 2003) ("All-In-One Living Room Gadgets"), Internet Archive, Bruce Wallace, So Much Cyber, So Little Space (Oct. 12, 2003) ("Wallace, So Much Cyber"), Internet Archive, Wilson Rothman, Devices Need a Common Language, New York Times (Aug. 19, 2003) ("Rothman"), Internet Archive, Michael Antonoff, Act Wirelessly, Think Globally, Convergence at 2003 CES (Aug. 19, 2003) ("Antonoff"), Internet Archive, Home Networks: A Couch Potato's Dream (Apr. 18, 2003) ("Couch Potato's Dream"), Internet Archive, Mediabolic Releases the "Mediabolic One Convergence Platform" (Apr. 23, 2011) ("Convergence Platform"), Broadband Home Report (Jan. 22, 2004), HP Wireless Digital Media Receiver ew5000, PC Magazine (Jul. 1, 2003), Internet Archive, Mediabolic, First Digital Home Compliant Product Now Commercially Available from Mediabolic (Feb. 17, 2004) ("Mediabolic NMPR").

Microsoft Windows Media Center Extender, including the product itself as well as all evidence of its release, operation, and functionality.
MobiTV, including the product itself as well as all evidence of its release, operation, and functionality, including but not limited to the following: Daniel Tynan, Cool Your Gadget Fever, PC World, (Jan. 2004), Gary Krakow, Streaming TV on your Cell Phone, MobiTV Provides News, Sports on a Postage-Stamp Sized Screen (Oct. 22, 2004), TV TO Go. Kinda., Popular Science (Feb. 2004).
Novatel Wireless Minstrel Products, including the products themselves as well as all evidence of their release, operation, and functionality, including but not limited to the following: Novatel Wireless, Handheld Modems (Oct. 4, 2003), Novatel Wireless Minstrel 540, Wireless Modem for the HP Jornada 540 Series Pocket PC (2000), Novatel Wireless Minstrell III, Wireless Internet Solution for the Palm Computing (2000), Novatel Wireless Minstrel V, Wireless Internet Solution for the Palm Computing Platform (2000), Novatel Wireless Minstrel S, Wireless Springboard Modem for Handspring Visor (2000).
OQO uPC, including the product itself as well as all evidence of its release, operation, and functionality, including but not limited to the following: A Computer in your Pocket, PC Magazine (Nov. 16, 2004), Popular Science (Mar. 2004).
Philips Steamium sl400i, including the product itself as well as all evidence of its release operation, and functionality, including but not limited to the following: Internet Archive, SimpleDevices, Product Showcase: Philips Streamium (Apr. 13, 2004) ("Philips/SimpleDevices"), Philips, Wifi Wireless Multimedia Link SL400i, Booklet (Feb. 4, 2004) ("SL400i Booklet"), Philips Wireless Multimedia Receiver SL400i All Versions Service Manual v1.0 (2004) ("SL400i Service Manual"), Philips Annual Report 2004, Philips Annual Review 2004, Internet Archive, Philips, PC Link (Dec. 6, 2003) ("PC Link Site"), Internet Archive, Philips, PC Link FAQ (Dec. 20, 2003) ("PC Link FAQ"), Internet Archive, Philips, Streamium Requirements (Jul. 20, 2004) ("Streamium Requirements"), Internet Archive, Philips, Streamium Specifications (Jul. 20, 2004) ("Streamium Specifications").
Philips Streamium mx6000i, including the product itself as well as all evidence of its release, operation, and functionality, including but not limited to the following: Philips MX6000i User Guide (2004), Philips MX6000i Product Literature (2004), Philips MX6000i Quick Use Guide, EL6572E002 (2004), Internet Archive, Philips Streamium MX6000i (Jun. 16, 2004).
Pinnacle Systems ShowCenter, including the product itself as well as all evidence of its release, operation, and functionality, including but not limited to the following: Digital Entertainment in the Home, The Home Computer & Connectivity, Parks Associates (2004).
Pinnacle MediaCenter, including the product itself as well as all evidence of its release, operation, and functionally, including but not limited to the following: Pinnacle Systems Advertisement, PC Magazine (Oct. 19, 2004), Digital Entertainment in the Home, The Home Computer & Connectivity, Parks Associates (2004).
PRISMIQ Media Player, including the product itself as well as all evidence of its release, operation, and functionality, including but not limited to the following: Michael Antonoff, Convergence, Sound & Vision Magazine (Apr. 2004), Popular Science (Mar. 2004), Broadband Home Report (Jan. 22, 2004), PRISMIQ Unveils the Future of Networked Home Entertainment with the Release of the PRISMIQ MediaPlayer (Jan. 6, 2003).
Rockford OmniFi, including the product itself as well as all evidence of its release, operation, and functionality, including but not limited to the following: Internet Archive, SimpleDevices Product Showcase (Apr. 14, 2004) ("SD Showcase"), SimpleDevices Releases New Version of its Software, SimpleWare 2.0 (Jan. 9, 2002) ("SimpleWare 2.0"), Broadband Home Report (Jan. 22, 2004), Hanford Choy and Axel Fuchs, Developing Innovative Devices Using Universal Plug and Play (UPnP), SimpleDevices (2004) ("Innovative UPnP SimpleDevices"), Joris Evers, RealNetworks Promotes Online Music Service Through More Hardware PC World (Nov. 10, 2003).
Fosgate Audionics FAP-S1 Digital Media Streamer, including the product itself as well as all evidence of its release, operation, and functionality, including but not limited to the following: Michael Antonoff, Convergence, Sound & Vision Magazine (Apr. 2004),

(56) References Cited

OTHER PUBLICATIONS

Roku Labs HD1000, including the product itself as well as all evidence of its release, operation, and functionality, including but not limited to the following: Advertisement, Sound & Vision Magazine (Apr. 2004), Broadband Home Report (Jan. 22, 2004), Popular Science (Mar. 2004), Digital Entertainment in the Home, The Home Computer & Connectivity, Parks Associates (2004), Roku HD1000 Specifications (Sep. 25, 2003), Roku HD1000 User Guide (2003), Roku HD1000 User Guide v1.5 (Jan. 2004), Roku HD1000 User Guide v1.5.18 (Apr. 2004), Internet Archive, Roku HD1000 Tech Specs (Oct. 2, 2003), Popular Science (Mar. 2004).
Sierra Wireless Air Card products, including the products themselves as well as all evidence of their release, operation, and functionality, including but not limited to the following: Sierra Wireless, AirCard 300 User Guide for Windows CE, Rev. 2.0 (Jul. 1999), Sierra Wireless, AirCard 300 User Guide for Notebooks, Rev. 3.0 (Apr. 2000), Sierra Wireless, Aircard 300 for Windows, Gettting Started, Rev. 1.0 (Aug. 1999), Sierra Wireless, AirCard 555 Wireless Network Card, Installation Guide, Rev. 4.0 (May 2003), Sierra Wireless, What's New, AirCard 555 for Verizon Wireless, Rev. 1.3A (2003), Internet Archive, Sierra Wireless, Sierra Wireless AirCard 710 Frequently Asked Questions (Nov. 24, 2003).
SimpleDevices SimpleWare, SimpleServer, and SimpleFi, including the products themselves as well as all evidence of their release, operation, and functionality, included but not limited to the following: SimpleDevices Releases New Version of its Software, SimpleWare 2.0 (Jan. 9, 2002) ("SimpleWare 2.0"), Internet Archive, SimpleWare Software Technologies (Jul. 10, 2004), ("SD SimpleWare"), Internet Archive, About SimpleDevices, Inc. (May 1, 2004) ("About SimpleDevices"), Internet Archive, SimpleCenter (May 2, 2004) ("SimpleCenter"), Internet Archive, SimpleDevices Has Developed a Flexible, Standards-Based Media Server Software Development Kit That Transforms a Gateway Device into an Intelligent and Powerful Media Server (Apr. 13, 2004) ("SD Media Server "), Internet Archive, A complete implementation of the Universal Plug and Play Standard for networked devices (May 2, 2004) ("SD UPnP Implementation"), Fuchs, A. and Choy, H., End to End Content Delivery Using UPnP and WiFi Networking, SimpleDevices (Jan. 10, 2004) ("Fuchs, SD Content Delivery"), Duffy Hayes, Innovative Devices for the Home and Car to Free Your MP3s, Broadband Business (Dec. 1, 2001), at 53 ("Hayes"), Internet Archive, SimpleDevices Product Solutions (Apr. 14, 2004) ("SimpleDevice Products"), Internet Archive, Solutions for Content Providers (Apr. 13, 2004) ("SD Content Providers"), Internet Archive, Solutions for Internet Service Providers (Apr. 13, 2004) ("SD ISP"), Internet Archive, Home Entertainment Solutions (Apr. 13, 2004) ("SD Home Entertainment"), Internet Archive, Network Gateway Solutions (Apr. 13, 2004) ("SD Network Gateway"), Internet Archive, Set-Top Solutions (Apr. 13, 2004) ("SD Set-Top"), Internet Archive, SimpleDevices Product Showcase (Apr. 14, 2004) ("SD Showcase").
SnapStream Firefly and SnapStream Beyond TV 3, including the product itself as well as all evidence of its release, operation, and functionality, including but not limited to the following: Media Servers, PC Magazine (Sep. 21, 2004), Jim Heid, Technology, Gear, Desktop Tube, TV Tuner Hardware Transforms Personal Computers into Television and Video Recorders, LA Times, (Feb. 18, 2002).
Sony LocationFree TV, including the product itself as well as all evidence of its release, operation, and functionality, including but not limited to the following: John P. Falcone, Sony's Subdued CES Lineup, CNET (Jan. 9, 2004), Suzanne Kantra Kirschner, Portable TV's Get Smart, Popular Science (May 2004), Suzanne Kantra Kirschner, Cutting the Cord, Popular Science (Mar. 2004).
Sony RoomLink, including the product itself as well as all evidence of its release, operation, and functionality, including but not limited to the following: Portable TVs Get Smart, Popular Science (May 2004), CNET, CES 2004: CNET Covers the Show: Sony's Subdued CES Lineup (Jan. 9, 2004), This Year's Top Gadget Show Sees a Battle to Emerge as Master of the Living Room Universe, San Fran. Chronicle (Jan. 13, 2003), Internet Archive, Home Networks: A Couch Potato's Dream (Apr. 18, 2003) ("Couch Potato's Dream").

SMC WMR-AG EZ-Stream Universal Wireless Multimedia Receiver, including the product itself as well as all evidence of its release, operation, and functionality, including but not limited to the following: Broadband Home Report (Jan. 22, 2004).
Sprint/Growell PCS Connection Card CF2031, including the product itself as well as all evidence of its release, operation, and functionality, including but not limited to the following: Sprint User's Guide, PCS Connection Card, Model: CF2031 (2002), Toshiba Pocket PC Insert PCS Connection Card CF2031 by Growell and Sprint, No. TOP2031-01 (2003) ("PCS CF2031 Connection Card"), PCS Connection Card CF2031, FAQ and Issues (Oct. 8, 2003), Internet Archive, CF2031 PCS Connection Card by Growell (Nov. 19, 2003), OceanLake Offers Wireless Products Over Sprint Network (Feb. 17, 2003).
Toshiba Pocket PC e800/e805, including the product itself as well as all evidence of its release, operation, and functionality, including but not limited to the following: Toshiba Pocket PC e800/e805 User's Guide, First Edition (Sep. 2003) ("e800/e805 User's Guide"), Toshiba Pocket PC e800/e805 Quick Guide, First Edition (Sep. 2003) ("e800/e805 Quick Guide"), Toshiba Pocket PC e800/e805, Quick Start and Quick Tour, Nos. C1894-1, HF62D0T0000 (2003) ("e800/e805 Quick Start and Quick Tour"), Toshiba Pocket PC e800/e805 Accesories Insert No. A622-1 (Oct. 2003) ("e800/e805 Accessories Insert"), Toshiba Important Information Literature, No. C1927-1 (2003), Toshiba Pocket PC Insert for PCS Connection Card CF2031 by Growell and Sprint, No. TOP2031-01 (2003) ("PCS CF2031 Connection Card"), Toshiba Announces Two New Pocket PC's— e400/405 and e800/e805, Brighthand (Oct. 23, 2003) ("Brighthand"), Brighthand, Toshiba e805/e800 Full Review (Dec. 8, 2003), Toshiba Pocket PC e800, System Characteristics Rev. 1.0b (Sep. 12, 2003), Tom Krazit, Toshiba Updates Pocket PCs, TechHive Media (Oct. 23, 2003), Toshiba Exhibits its Best in Mobile Computing at the 2004 International Consumer Electronics Show, Business Wire (Dec. 30, 2003), Toshiba Pocket PC e740/e750/e755, including the product itself as well as all evidence of its release, operation, and functionality, including but not limited to the following: Toshiba Pocket PC e740 User's Manual, First Edition (Mar. 2002), Toshiba Pocket PC e740/e755 User's Guide, First Edition (Mar. 2003), Toshiba Pocket PC e750 User's Manual, First Edition (Mar. 2003), Toshiba Pocket PC Insert for PCS Connection Card CF2031 by Growell and Sprint, No. TOP2031-01 (2003) ("PCS CF2031 Connecion Card"), Russell Kaym, Handheld Powerhouses; Today PDAs are Like Clown Cards: Tiny on the Outside, Yet They Give Forth Enormous Volumes of Features and Power (Jul. 29, 2002), Roger Gann, Toshiba e470: A Pocket PC Packed with Uniques Features That Make it Stand out from the Crowd (Nov. 1, 2002), Roger Gann, Web-Enabled PDAs: Want to Put the Internet In Your Pocket? We Test Five Handhelds Which Can (Dec. 1, 2003), Jack Shonfield, Super PDA Could Replace the PDA, Computer Weekly (Jul. 25, 2002), Pocket PC Products and Accessores, The Student's Best Friend (Jun. 24, 2002), Toshiba Pocket PC Incorporated Intersil WLAN Technology (Sep. 1, 2002), Toshiba Launches the First Handheld PC with Integrated Wireless Connectivity (Jun. 24, 2002), OceanLake Offers Wireless Products Over Sprint Network (Feb. 17, 2003), Toshiba Pocket PC, A True Vision, Wireless Ethernet A Breeze (Sep. 24, 2002).
Toshiba Wireless Data Projectors, including but not limited to TLP-T720, TLP-T721, TLP-T620, TLP-T621, TLP-T520, TLP-T521, TLP-T520E, TLP-T521E, TLP-S220, and TLP-5221, including the products themselves as well as all evidence of their release, operation, and functionality, including but not limited to the following: Toshiba 3LCD Data Projector Owner's Manual (2000).
Home networked device interroperability guidelines, v1.0, DLNA.
DLNA networked device interroperability guidelines, vol. 1: architectures and protocols, expanded: Oct. 2006.
UPnP forum, UPnP certification testing, vol. V Fourth Quarter 2001.
Sandy and dave's report on the broadband home; Broadband home report: Jan. 22, 2004 issue.
Advisory committee final report and recommendation; federal communications commission, advisory committee on advanced television service, Nov. 28, 1995.

(56) References Cited

OTHER PUBLICATIONS

<ServiceControlSyntaxTestCases>.
UPnP enables business opportunities, Salim AbiEzzi, Universal plug and play connections, vol. IV, second quarter 2001.
The UPnP forum is a means to an end, Salim AbiEzzi, Universal plug and play connections, vol. III, first quarter 2001.
Exploiting location-based composite devices to support and facilitate situated ubiquitous computing, Thai-Lai Pham, Georg Schneider, and Stuart Goose, P. Thomas and H-W Gellerson(Eds.) HUC2000, LNCS 1927, pp. 143-156, 2000, springer-verlag berlin hcidolberg 2000.
Connection Manager:1; service Template Version 1.01; for universal plug and play version 1.0; status: standardized DCP; Jun. 25, 2002.
Scanner:1.0 device template version 1.01 for universal plug and play version 1.0; status: standardized DCP, Sep. 11, 2002.
Euro-Par 2003 Parallel Processing, 9th international Euro-Par conference, Klagenfurt, Austria, Aug. 2003 Proceedings.
Tech TV's best of CES 2004 Winners.
Innovative devices for the home and car to free your MP3s! CED Dec. 1 2001, LexisNexis, Dec. 1, 2001.
HP Wireless digital media receiver ew5000; the HP wireless digital media receiver ew50000 is easy to set up, fairly easy to use, and surpassed only by the prismiq mediaplayer in features, PC magazine J, LexisNexis Jul. 1, 2003.
DENI Architecture Draft CEA-#TBC.
<DeviceDescriptionSnytaxREgEx>.
UPnP Design by Example.
Final Technical Report, FCC Advisory Committee on Advanced Television Service, Oct. 31, 1995.
Mediabolic releases its convergence platform at connections 2001, May 3, 2001, Mediabolic, Inc. >Press&Events.
Toshiba Updates Pocket PCs, by Tom Krazit, Oct. 23, 2003, Phones (/category/phones).
Media distribution: the next compelling scenario for home networks; Salim Abiezzi, UPnP newsletter, third quarter, 2002.
It just works:UPnP in the digital home by Michael Jeronimo, Oct. 5, 2004; escalate software.
PC Magazine, Oct. 19, 2004.
Pocket PC connection manager update, Internet Archive Waybackmachine, Nov. 19, 2003.
Get yourself connected, Macworld, Jul. 2004.
PC magazine, Sep. 21, 2004.
Mediabolic announces support for universal plug and play (UPnP) to enable networked entertainment products. Nov. 6, 2001, Internet Archive Waybackmachine.
Popular science, Feb. 2004.
MediaRenderer:1 device template version 1.01 Jun. 25, 2002.
Overview of UPnP AV architecture, a digital media distribution technology for the home, Research and development at Intel, version 1.00, Jul. 2, 2003.
AVTransport:1 service template version 1.01, Jun. 25, 2002.
Intel's Upnp tools package; Intel copyright 2002.
Intel, Internet Archive Waybackmachine, Oct 3, 2003.
Media server:1 device template version 1.01, Jun. 25, 2002.
IEEE explore digital library, adhoc personal ubiquitous multimedia services via upnp, multimedia and expo, 2001.
Intel News Release, Intel, industry leaders develop first standards-based products enabling premium content for the digital home, Sep. 8, 2004.
Popular science journey to the 10th dimension, Mar. 2004.
High-Definition Multimedia Interface Specification, Informational Version 1.0 (Sep. 4, 2003), High-Definition Multimedia Interface Specification, Informational Version 1.1 (May 20, 2004), Anush Yegyazarian, TVs of the Future: Flat and Huge, PC World (Jan. 27, 2004), Crutchfield Catalog (Summer 2004).
Toshiba Important Information Literature, No. C1927-1 (2003), Toshiba Pocket PC Insert for PCS Connection Card CF2031 by Growell and Sprint, No. TOP2031-01 (2003) ("PCS CF2031 Connection Card"), Toshiba Announces Two New Pocket PC's—e400/405 and the e800/805, Brighthand (Oct. 23, 2003) ("Brighthand").

\* cited by examiner

METHODS, SYSTEMS AND APPARATUS FOR DISPLAYING THE MULTIMEDIA INFORMATION FROM WIRELESS COMMUNICATION NETWORKS

CROSS REFERENCE TO RELATED APPLICATIONS

This application is a continuation of U.S. application Ser. No. 14/479,568, filed on Sep. 8, 2014, which is a continuation of U.S. application Ser. No. 14/177,396, filed on Feb. 11, 2014, which is a continuation of U.S. application Ser. No. 13/845,171, filed on Mar. 18, 2013, which is a continuation of U.S. application Ser. No. 13/495,890, filed Jun. 13, 2012, which is a continuation of U.S. application Ser. No. 13/397,156, filed Feb. 15, 2012, which is a continuation of U.S. application Ser. No. 13/268,001, filed on Oct. 7, 2011, which is a continuation of U.S. application Ser. No. 12/929,408, filed on Jan. 21, 2011, which is a continuation of U.S. application Ser. No. 11/165,341, filed on Jun. 24, 2005, now U.S. Pat. No. 7,899,492, issued Mar. 1, 2011, which claims the benefit of provisional application Ser. No. 60/588,358, filed on Jul. 16, 2004 and entitled "A Method and System for Displaying the Multimedia Information from Wireless Communications or Portable IT Devices." The entire contents of these applications are hereby incorporated by reference.

BACKGROUND OF THE INVENTION

1. Field of the Invention

This invention relates generally to mobile terminals and related technology and more particularly to mobile terminal signal conversion for external display.

2. Description of the Related Art

Handheld mobile terminals (e.g., cellular phones, personal digital assistants (PDA)) continue to evolve both in terms of execution platform and functionality. It is believed that the much of the functionality provided by a personal computer (e.g., desktop or laptop) will ultimately become virtually available in handheld mobile terminals, which will allow users to work with and access multimedia information any time and anywhere.

For example, one particularly appealing advantage of the next generation wireless communication system and beyond (i.e., 3G, 4G, etc.) is the capacity to support high rate multimedia data services as well as conventional voice services. In a conventional cellular system a mobile terminal communicates with a base station wirelessly. Multimedia information including but not limited to television, 3D images, network games, and video phone calls is transmitted from various service providers and received for display on the screen of a mobile terminal. The net result of such a system is rich multimedia information being destined for display on the small screens typical of cellular phones (or the like).

In these and similar systems, the mobile terminal functions as a multimedia terminal to display multimedia information (including high-resolution graphics and high-quality real-time audio/video) sent from high data rate wireless communications network. The limited size (e.g., 2×3") and capability of the mobile terminal screen may render enjoyment of the high rate data flow applications inconvenient, and in some instances useless. One consequence of this inadequacy is likely shrinkage of the potential market size for handheld mobile terminals. Indeed, some have suggested that development of high data rate systems such as 3G systems may be pointless given the limitations imposed by the small screen.

Some mobile units appear to provide a remote control function to an external display system. However, these do not appear to solve the small screen problem outlined above. That is, they do not accommodate display on a larger, external display of video and other multimedia information originally destined for the mobile terminal display screen.

For example, one such interface accommodates usage of the mobile terminal as a remote control for a television, by feeding programming guide information to the mobile terminal. This is useful for allowing the programming guide to be viewed locally while the larger screen displays a current program, but does not address to the above-described small screen problem.

Although mobile terminals have been developed to include enhanced signal processing and related capabilities, user enjoyment is diminished by the limitations of the display provided with such mobile terminals. What is needed is a solution to the problem of diminished user enjoyment of mobile terminals because of display limitations.

SUMMARY OF THE INVENTION

In accordance with the present invention, the multimedia signal destined for the mobile terminal is converted and provided to an external display system, so that the corresponding video and/or audio may be reproduced using the external system.

It is believed that this feature will be useful in various environments, including but not limited to transportation environments such as planes, trains and automobiles; hotels; waiting areas; and any location where high data rate services can be more fully supported by external display terminals.

According to one aspect, processing signals for reproduction by an external display terminal includes receiving a video signal that accommodates a video display on a first screen provided by the mobile terminal. The video signal is then processed to provide a converted video signal appropriate for an external display terminal that is separate from the mobile terminal. This converted video signal is then provided for the external display terminal to accommodate the corresponding video display on a screen provided by the external display terminal.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
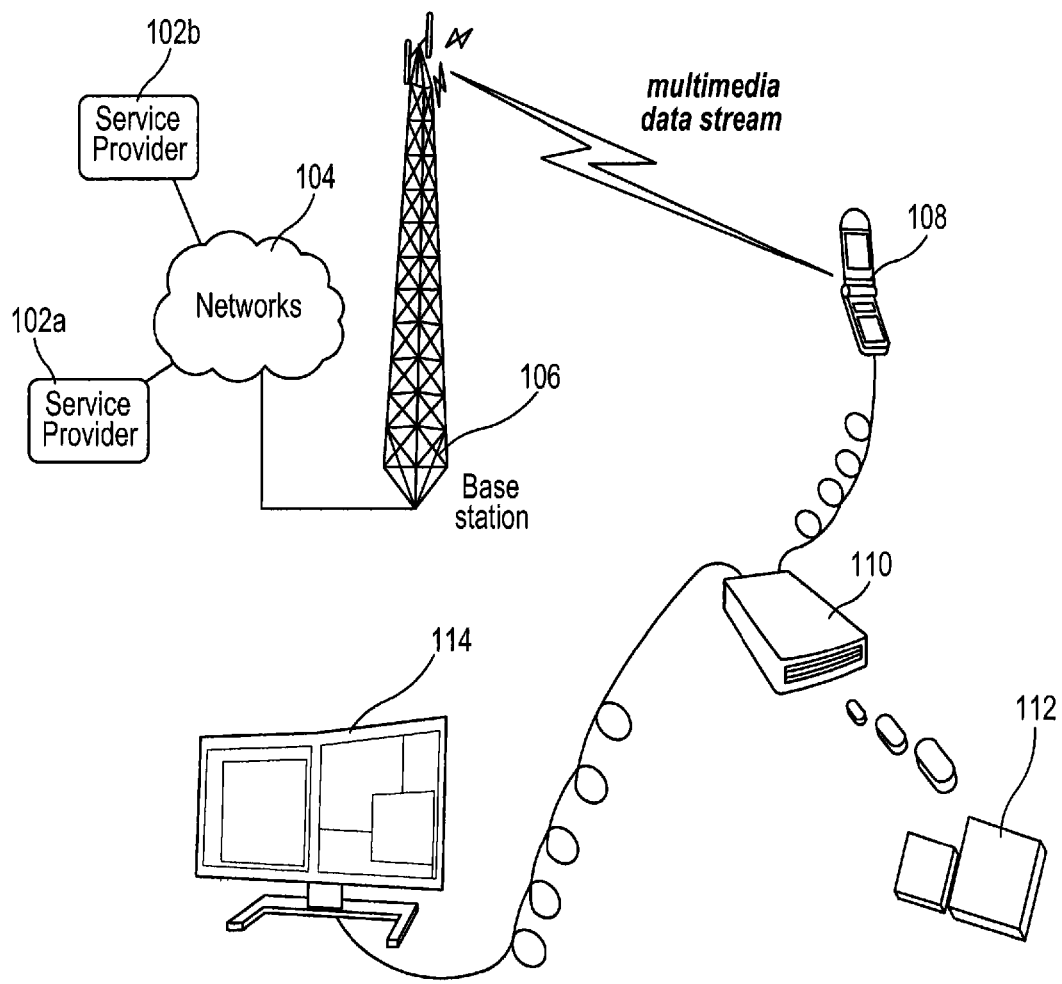
FIG. 1 is a schematic diagram illustrating an example of a system in which mobile terminal signal conversion may reside in accordance with the present invention.

FIG. 1 is a schematic diagram illustrating an example of a system 100 in which mobile terminal signal conversion may reside in accordance with the present invention.

Mobile terminal signal conversion accommodates displaying the high rate data flow multimedia information available in a wireless communication environment in an external device. This accommodates true realization and enjoyment of the benefits of the multimedia content.

In one example, the multimedia information is provided to a wireless mobile terminal using so-called next generation cellular technology (i.e., 3G and 4G), which can be employed in transmitting multimedia information (e.g., rich graphics, real-time audio/video). Because of the relatively small screen size and low quality ear phones, for many applications the mobile terminal cannot adequately reproduce the high quality multimedia information that can be communicated using next generation technology with adequate clarity and satisfaction. Mobile terminal signal conversion in accordance with this embodiment of the present invention makes usage of a separate multimedia display terminal including but not limited to a monitor, television set, projector, or LCD display. These displays typically have video and audio reproduction capabilities that are superior to those found on mobile terminals. They also use a power supply that is separate from the mobile terminal.

Still referring to the system 100 illustrated in FIG. 1, multimedia information may be provided by any number of service providers 102a-b and delivered through a network 104 to a base station 106 to ultimately accommodate transmission of the multimedia information, among other things, to a cellular phone 108. This system 100 is provided by way of example, and it should be understood that any conventional or to-be-developed technology for delivering voice and/or data to mobile terminals may be provided. These wireless communication networks include but are not limited to a cellular communications network or a wireless local area network.

Also illustrated is a typical external display system 114. This may also be variously provided and may be digital or analog. Examples of digital systems include HDTV, LCD and plasma. Examples of analog systems include television sets that implement standards such as NTSC, PAL, SECAM, and analog computer monitors (SVGA, VGA). The external display system 114 does not have the size constraints of the display screen on the cellular phone 108 and is preferably powered independently.

In the illustrated embodiment, a mobile terminal signal conversion module (MTSCM) 112 resides within a separate housing 110, outside the cellular phone 108.

Figure 4:
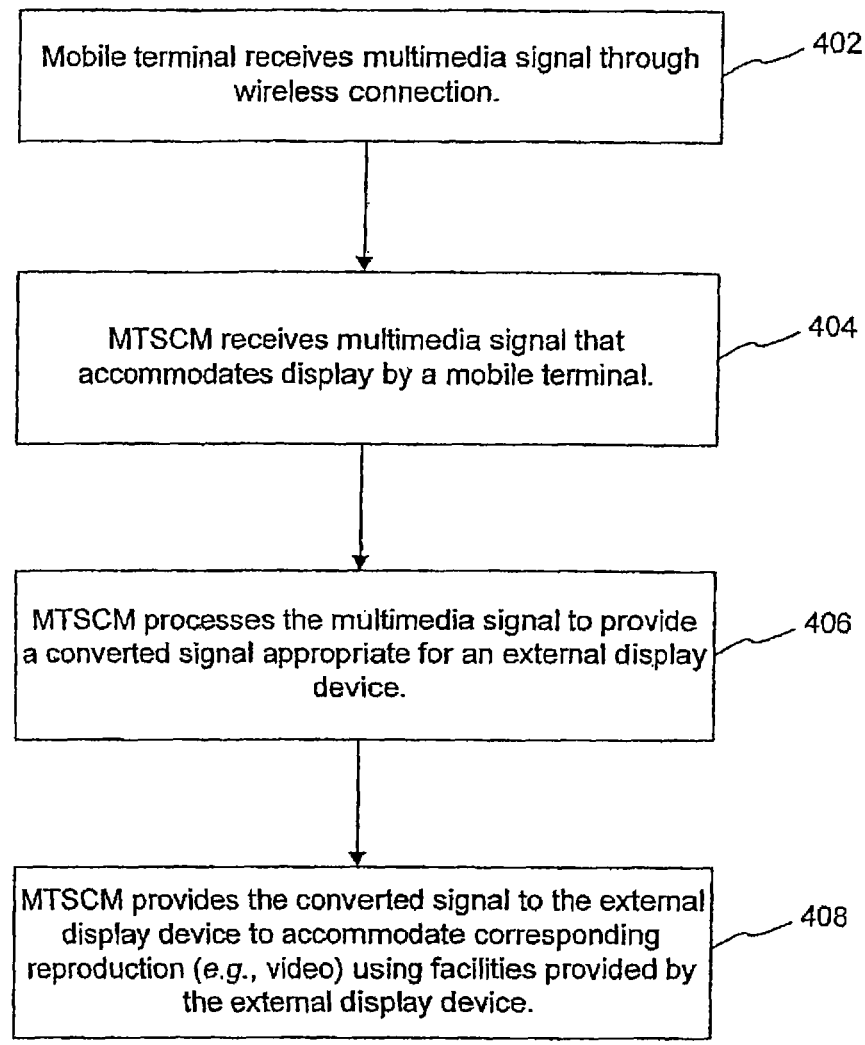
FIG. 4 is a flow diagram illustrating an embodiment of a process including mobile terminal signal conversion in accordance with the present invention.

The functionality of the MTSCM 112 is now further described with concurrent reference to FIG. 1 and the flow diagram of FIG. 4.

The MTSCM 112 processes signals to accommodate reproduction by an external device. Specifically, a multimedia signal is transmitted to the cellular phone 108 through the wireless communications network as previously described (step 402). The multimedia signal may include a video signal intended for reproduction by the cellular phone 108, using the cellular phone display screen. For ease of description, processing of a video signal is described, although it should be understood that any multimedia signal or component thereof may be converted in accordance with the present invention.

The cellular phone 108 is connected to the MTSCM 110. This may be accommodated by a cable connection that interfaces the cellular phone 108 to the MTSCM 112 housing 110. Through this connection, the MTSCM 112 receives the video signal from the cellular phone 108 (step 404). The video signal as received may be configured to accommodate a video display on the screen provided by the cellular phone 108. The cable connection is an example of a wired connection interfacing the cellular phone 108 to the MTSCM 112. An alternative wired connection is a seat that directly interfaces the two without a cable. A wireless connection may also be provided, although it may currently be less practical to provide than the wired connection because of the potential for high throughput rate requirements. The wireless connection may also implement any conventional known technology including but not limited to a Bluetooth connection.

The MTSCM 112 processes the video signal to provide a converted video signal that has a display format and/or signal power level appropriate for an external display terminal 114 that is separate from the cellular phone 108 (step 406). The display format and/or signal power level of the external display terminal 114 may be different from that of the cellular phone 108 but there may also be embodiments where the format is the same. Even if the formats are the same, conversion of the signals to accommodate display on the external display terminal 114 would still be implemented to adjust the power level for driving the external display, and possibly to minimize throughput requirements. This signal conversion is described further with reference to FIGS. 2 and 3, below.

Still referring to FIGS. 1 and 4, following signal conversion, the MTSCM 112 provides the converted video signal to the external display terminal 114 to accommodate the corresponding video display on a screen provided by the external display terminal 114 (step 408). This may be accommodated through a connection between the MTSCM 112 housing 110 and the external display terminal 114 as shown.

As used herein, mobile terminal refers to typically handheld mobile devices such as cellular phones and personal digital assistants. Although these devices include an execution platform as well as input and display capabilities, such devices are distinguished from personal computers, such as desktop or laptop computers, which are not designed for convenient handheld usage.

Figure 2:
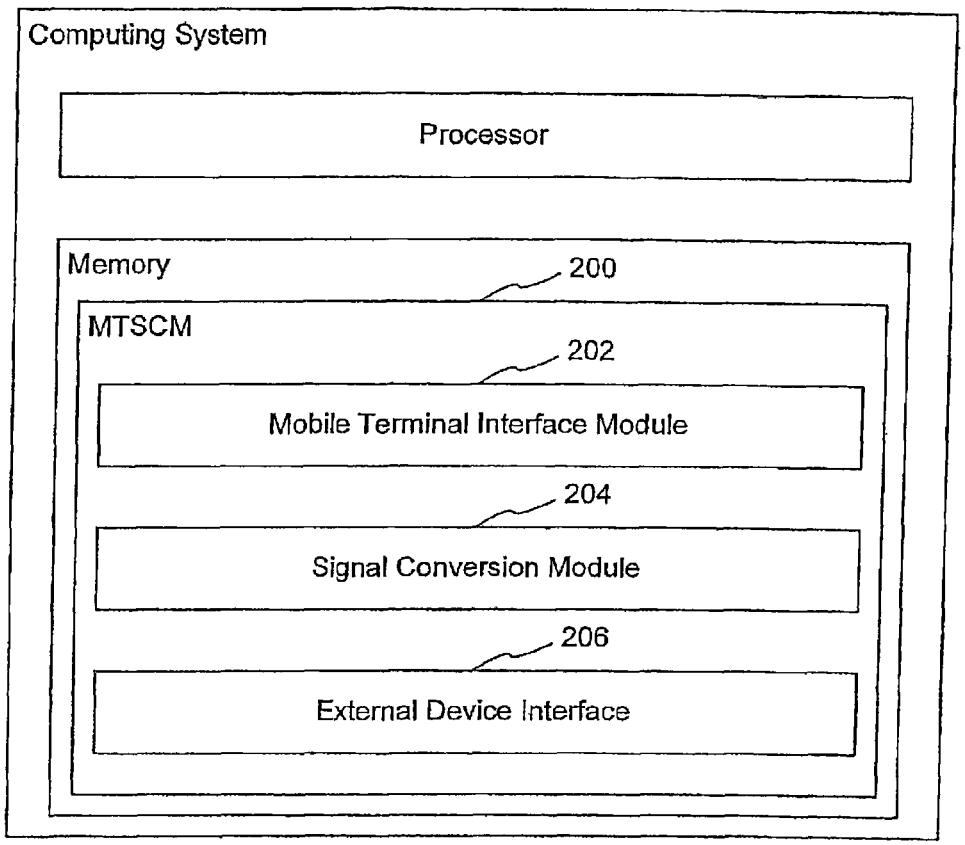
FIG. 2 is a block diagram illustrating an example of a mobile terminal signal conversion module in accordance with the present invention.

FIG. 2 is a block diagram illustrating an example of an MTSCM 200 in accordance with the present invention. The MTSCM 200 may be provided as software, firmware, hardware, or any combination thereof.

Where the MTSCM 200 is provided as software, it operates in the context of an execution platform. That is, the MTSCM 200 includes instructions that are stored in memory for execution by a processor. Any conventional or to-be-developed execution platform may be used. The processor, memory, and related elements such as a power supply are well known and need not be described herein to convey an understanding of the invention. Additionally, FIG. 2 illustrates one modular breakdown for the components of the MTSCM 200. It should be understood that the described functionality may alternatively be provided by an MTSCM having fewer, greater, or differently named modules from those illustrated in the figure.

Additionally, although modules as shown to reside in a common location, it is noted that the functionality may reside in separate components of a system that includes a mobile terminal, an external monitor, and (optionally) an intermediate device housing the MTSCM and interfacing the mobile terminal and external monitor. In other words, the overall functionality of the MTSCM may be separated such that portions of the overall functionality are respectively provided by the mobile terminal, separate intermediate housing, and/or the external display device.

The MTSCM 200 may also be provided in the form of a chipset, configured for inclusion in a mobile terminal, dedicated separate signal conversion device, or external display terminal, and to provide the described mobile terminal signal conversion functionality.

The MTSCM 200 includes a mobile terminal interface module 202, a signal conversion module 204, and an external device interface module 206.

The mobile terminal interface module 202 accommodates receiving the multimedia signal from the mobile terminal. A conventional physical interface provides a connection between the MTSCM 200 and the mobile terminal through which the signals flow to the MTSCM 200. The mobile terminal interface module 202 recognizes the multimedia signal and stores the signal for processing by the remaining modules. Buffering and the like may be implemented to accommodate storage and signal processing, as described further below.

The signal conversion module 204 is in communication with the mobile terminal interface module 202 and thus accesses the received multimedia signal. The signal conversion module 204 recognizes the multimedia signal format, and processes the multimedia signal to provide a converted signal. The converted signal may have a format and a signal power level that differs from the one used by the mobile terminal, as appropriate for one or more types of external devices to which the MTSCM 200 is connected. Various examples of the type of devices to which the MTSCM 200 may be connected are illustrated and described in connection with FIG. 3, below.

The external device interface 206 is in communication with the signal conversion module 204 and thus accesses the converted signal. The external device interface 206 also allows connection to the external (e.g., display) device. The external device interface 206 may provide both the feeding of the converted signal to the external device, and driving the external device. Alternatively, the external device interface 206 may merely feed the converted signal to the external device, with the external device including internal elements for driving its signal reproduction (e.g., display) facilities.

Figure 3:
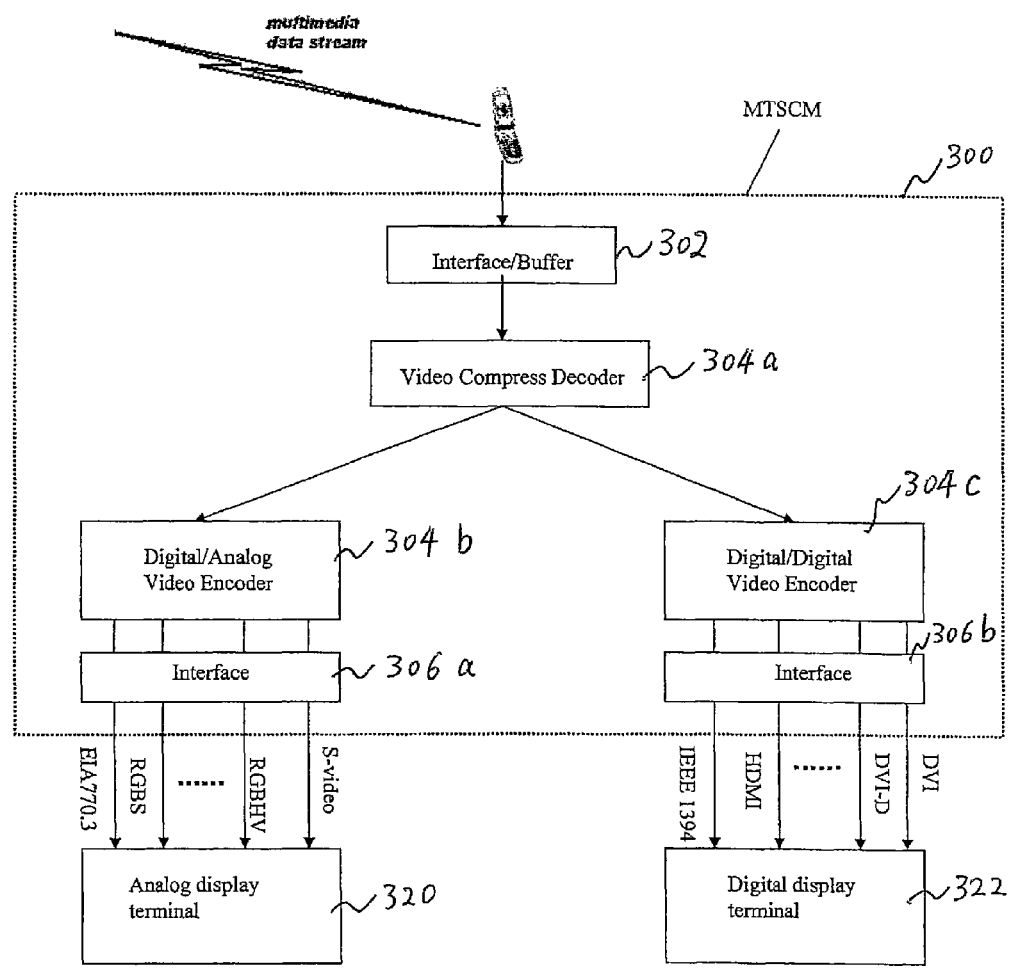
FIG. 3 is a block diagram illustrating another example of a mobile terminal signal conversion module in accordance with the present invention.

FIG. 3 is a block diagram illustrating another example of the MTSCM 300. The MTSCM 300 includes additional detail regarding the signal conversion aspect, and illustrates examples of differing types of external devices to which the MTSCM 300 may provide converted signals. The illustration and corresponding description are provided by way of example. Although numerous connections are illustrated, it should be understood that the present invention may be practiced in the context of providing as few as one, and as many as all of the listed connections. It should also be understood that there may be additional examples that are not listed herein, but which are encompassed by the teachings described herein.

The MTSCM 300 includes an interface/buffer module 302 that is analogous to the previously described mobile terminal interface module. The buffer and interfacing are configured to accommodate signal processing by the remaining elements in support of the requirements and expectations of users of the multimedia signal output (e.g., adequate buffering and processing rate to provide real time audio/video). The mobile terminal video compression format may of course vary, but currently the most likely format is MPEG-1 or MPEG-2. Buffering and throughput rate may also be provided as desired by the designer. Currently, it is believed that 200 Mb is an adequate buffer size, although buffers of 500 Mb or more may of course be provided. Additionally, a throughput rate of approximately 10 Gb/s will be adequate for many current systems, but may be increased as demands and technology evolve.

The Video Compress Decoder 304a receives the multimedia signal. The multimedia signal is typically provided in a compressed format to accommodate increased signal transfer rates. An example of a compression scheme is that provided by one of the MPEG standards (e.g., MPEG-1, MPEG-2, MPEG-4). The Video Compress Decoder 304a is configured to include the appropriate compression/decompression (CODEC) module to accommodate decompression of the received multimedia signal. For example, where the compression scheme is MPEG, the Video Compress Decoder 304a includes an MPEG CODEC to accommodate processing of such multimedia signals.

As an alternative to provision of the Video Compress Decoder 304a in the MTSCM 300, the functionality may be provided within the cellular phone or other mobile terminal. However, this may be less practical because of the high bandwidth that would be required between the cellular phone and the MTSCM 300 to deliver the decompressed signal, and the corresponding likelihood of a larger buffer requirement for the MTSCM 300.

The Video Compress Decoder 304a outputs a decompressed digital multimedia signal that is passed to the Digital/Analog Video Encoder (DAVE) 304b and/or the Digital/Digital Video Encoder (DDVE) 304c. The DAVE 304b is configured to prepare signals for analog external display terminals 320, and the DDVE 304c is configured to prepare signals for digital external display terminals 322. The DAVE 304b and DDVE 304c respectively receive the decompressed multimedia signal and convert the signals to the format(s) and signal power level(s) required for the terminals to which they interface.

Examples of formats used by analog display terminals 320 include S-video, RGBHV, RGBS, and EIA770.3 as illustrated. Similarly, the DDVE 304c provides output using standards such as DVI, DVI-D, HDMI, and IEEE1394. The signals respectively provided by the DAVE 304b and DDVE 304c are provided to the terminals through conventional interfaces 306a-b. The DAVE 304b functionality may be embodied as a video card that is configured accordingly. Examples of video cards that may be configured to provide the described functionality include but are not limited to the Diamond Stealth S60, ASUS V9400-X, or RADEON 7000.

Ultimately, the signals are used to provide a display on the external display, as required according to the particular type of display. For example, the video data stream may be a digital RGB signal which represents the intensity of the red, green and blue light respectively at different position. This signal is converted to analog by a D/A converter. This converted analog signal is quantified to the voltage and format required by the standard, such as the input of cathode-ray-tube (CRT) monitor. This standard video signal will drive a set of electron guns, which produce a controlled stream of electrons to display of red, green and blue light respectively on a CRT screen. This is but one example and the present invention is not limited to a particular technology (e.g., CRT) for the external display.

As described, in one embodiment the MTSCM may be independently housed separately from both the mobile terminal and external display terminal, with respective connections to the other devices to provide a system configuration that includes the three pieces of hardware (mobile terminal, conversion box, external display terminal). This configuration provides the flexibility of allowing any standard mobile terminal and/or display to be potentially interface with the MTSCM without imposing constraints on the mobile terminal or external display terminal manufacturers. A possible drawback to this configuration is that additional hardware is introduced into the system.

Figure 5:
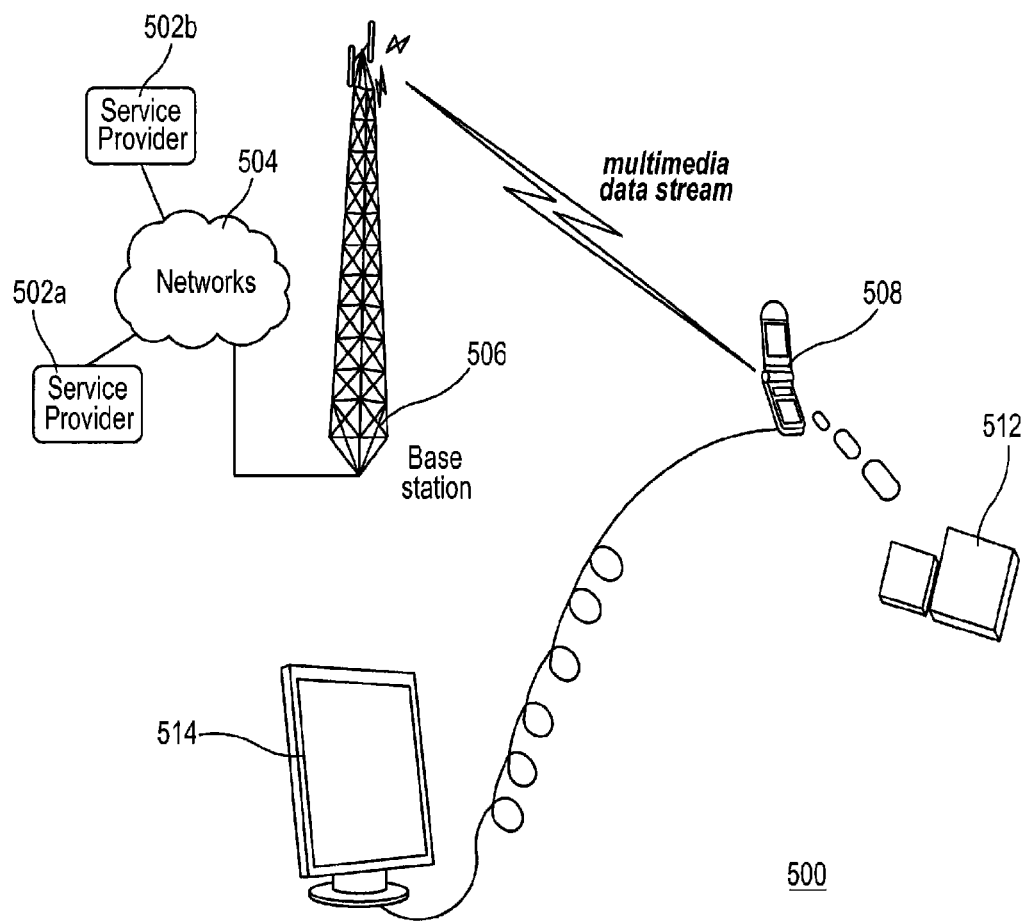
FIG. 5 is a schematic diagram illustrating another example of a system in which mobile terminal signal conversion may reside in accordance with the present invention.

In lieu of the three component system, the MTSCM may be located in either the mobile terminal or the external display. FIG. 5 is a schematic diagram illustrates an example of a system 500 in which the MTSCM mobile terminal signal conversion may reside within the mobile terminal 508. The components and functionality of the service providers 502a,b network 504 and base station 506 for delivering multimedia signals to the mobile terminal 508 is the same as for the analogous elements of FIG. 1 and need not be re-described. Similarly, the external display terminal 514 may be any of the various types named above.

The MTSCM 512 provides the same functionality described above. However, in contrast to residence in a separate housing, the MTSCM 512 is a component of the mobile terminal 508. A potential advantage of this system 500 is that, again, any standard equipment can serve as an external display terminal 514, without a constraint on the display manufacturer. Additionally, only a simple wired or wireless interface is required to connect the external display with the mobile terminal 508. This means, for example, that the user will not be required to carry a bulky conversion module in addition to their cellular phone.

A potential drawback to this system 500 is that the execution platform of the mobile terminal 508 may be designed to accommodate only traditional functionality, so for some systems it may be challenging to add the MTSCM functionality to the existing platform. Additionally, the MTSCM will consume power that may unduly exhaust the limited power supply offered by the mobile terminal 508 battery. It is useful for this embodiment to provide power to the mobile terminal 508 through the cable connection to the external display terminal 514, but again this may require modification to the mobile terminal 508 as the existing charger interface may be insufficient.

Figure 6:
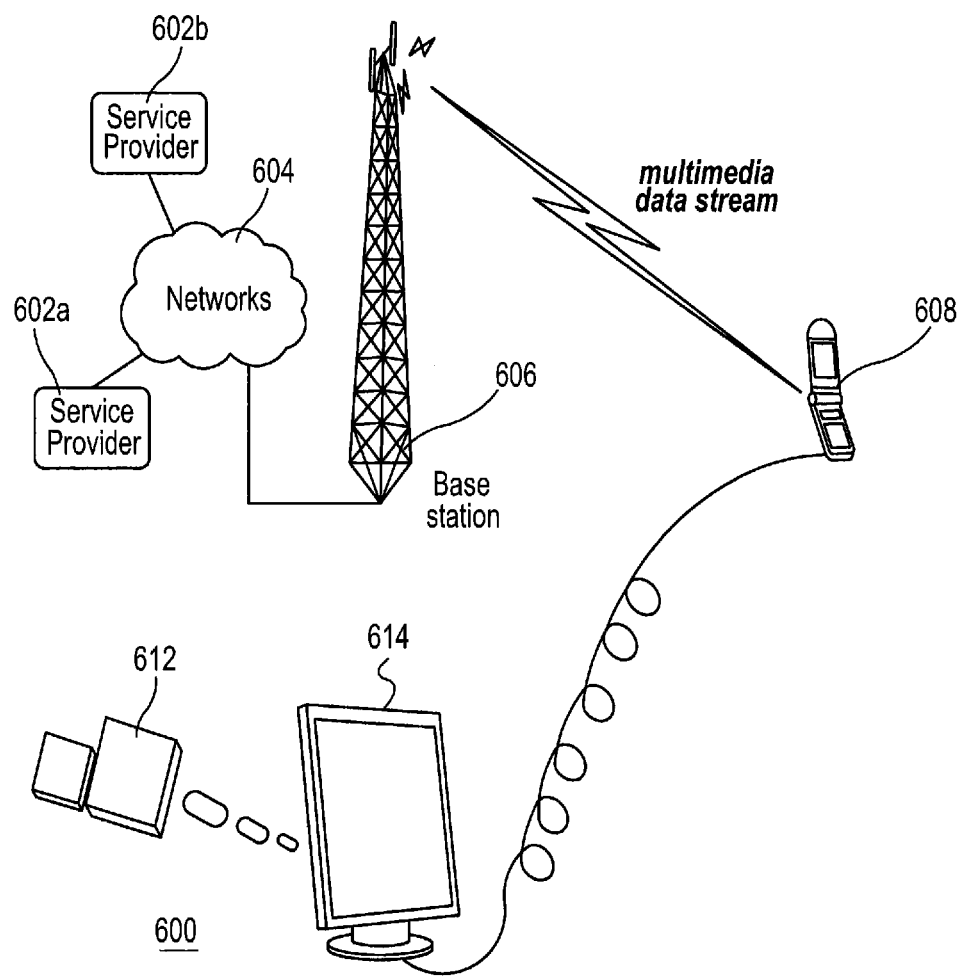
FIG. 6 is a schematic diagram illustrating still another example of a system in which mobile terminal signal conversion may reside in accordance with the present invention.

FIG. 6 is a schematic diagram illustrating another example of a system 600, in which the MTSCM 612 resides within the external display terminal 614. As with FIG. 5, the components and functionality of the service providers 602a,b network 604 and base station 606 for delivering multimedia signals to the mobile terminal 608 is the same as for the analogous elements of FIG. 1 and need not be re-described.

Here, the mobile terminal 608 need only be connected directly to the external display terminal 614. However, in lieu of having the MTSCM 612 functionality reside within the mobile terminal 608, it is part of the external display terminal 614. The power supply and execution platform issues associated with placing the MTSCM 614 in the mobile terminal are resolved with this system 600, and any mobile terminal 608 can potentially be connected to any MTSCM-ready external display without requiring modification, other than provision of an output interface. A potential drawback of this configuration is that it adds a component to the standard external display terminal, and corresponding costs.

Figure 7:
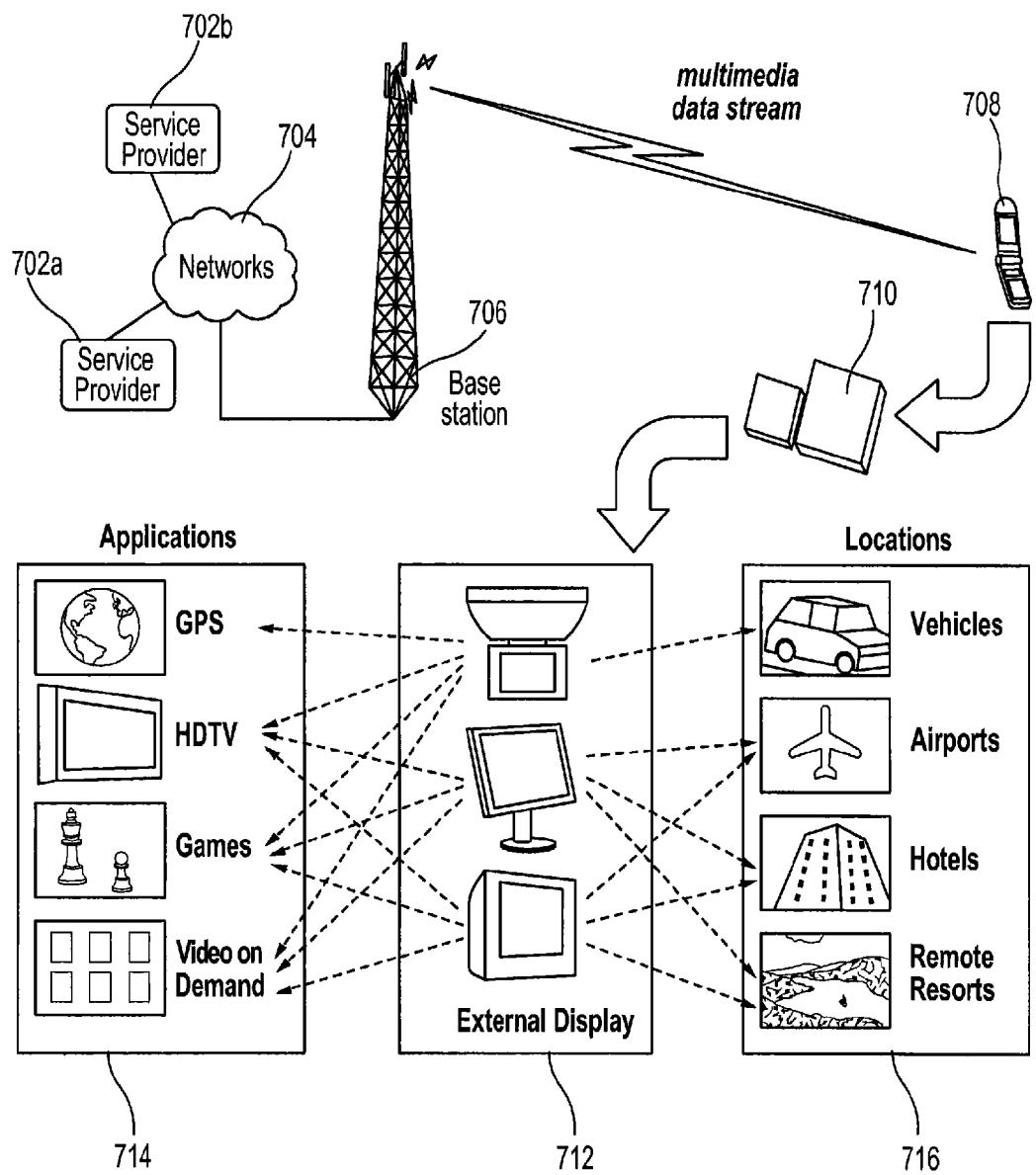
FIG. 7 is a schematic diagram illustrating examples of mobile terminal signal conversion applications in accordance with the present invention.

FIG. 7 is a schematic diagram illustrating examples of mobile terminal signal conversion applications 700 in accordance with the present invention. These applications 700 are provided by way of example, to give the reader an understanding of the potential contexts in which embodiments of the present invention may operate. The present invention is not limited to the disclosed applications, nor are all potential applications required for any given embodiment.

The basic architecture for provision of the wireless communications signal and corresponding multimedia signal is as described above for the service providers 702a-b, network 704, base station 706 and mobile terminal 708. The MTSCM 710 may be separate or reside in the mobile terminal 708 or display terminal 712. Examples of applications 714 where a larger screen and potentially superior audio may be enjoyed include video conference, HDTV, games, GPS, and video on demand. Additionally, embodiments of the present invention will accommodate enjoyment of full multimedia capability in locations 716 including vehicles, airports, hotels and remote resorts. Thus, for example, the present invention accommodates usage inside a vehicle, a plane or any type of transportation, enabling the passenger to browse the Internet, watch TV, play games, participate in a video conference or call, and work on all sorts of software with full functionality.

Thus embodiments of the present invention produce and provide mobile terminal signal conversion. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A cellular phone comprising:
    an input interface configured to receive a multimedia signal appropriate for displaying a multimedia content on the cellular phone, wherein the multimedia signal is a compressed digital signal;
    at least one processing unit configured to perform a processing of the multimedia signal,
    wherein the processing of the multimedia signal comprises decompressing the compressed digital signal to a decompressed digital signal,
    wherein the processing of the multimedia signal further comprises encoding the decompressed digital signal to produce an encoded digital signal, and
    wherein the encoded digital signal comprises a decompressed high definition digital video signal; and
    a high definition digital output interface configured to transmit the encoded digital signal to a high definition digital display through a cable and to receive power through the cable.

2. The cellular phone of claim 1, wherein the cellular phone is configured to receive the power during the processing of the multimedia signal; and wherein the cellular phone is configured to receive the power while the encoded digital signal is transmitted to the high definition digital display.

3. The cellular phone of claim 2, wherein the cellular phone is configured to receive the power during the processing of the multimedia signal to avoid exhaustion of an internal battery power supply of the cellular phone.

4. The cellular phone of claim 3, wherein the cellular phone is configured to receive the power from the high definition digital display through the cable.

5. The cellular phone of claim 4, wherein the cellular phone is configured to receive the power during the processing of the multimedia signal to provide power for the processing of the multimedia signal and to charge the internal battery of the cellular phone during the processing of the multimedia signal.

6. The cellular phone of claim 3, wherein the cellular phone is configured to receive the power during the processing of the multimedia signal to provide power for the processing of the multimedia signal and to charge the internal battery of the cellular phone.

7. The cellular phone of claim 2, wherein the cellular phone is configured to receive the power during the processing of the multimedia signal to contribute for power for the processing of the multimedia signal.

8. The cellular phone of claim 2, wherein the cellular phone is configured to receive the power during the processing of the multimedia signal to provide power for the processing of the multimedia signal and to charge the internal battery of the cellular phone during the processing of the multimedia signal.

9. The cellular phone of claim 8, wherein the cellular phone is configured to receive the power from the high definition digital display through the cable.

10. The cellular phone of claim 9, wherein the high definition digital output interface is a mobile high definition link interface; and wherein the multimedia content is one or more of the following: a video game, GPS, a video on demand, a 3D image, a high definition television (HDTV), a video, and a video conference.

11. The cellular phone of claim 9 further comprising a decoder, wherein the decoder is configured to perform said decompressing the compressed digital signal to the decompressed digital signal; and wherein the cellular phone further comprises an encoder, wherein the encoder is configured to perform said encoding the decompressed digital signal to produce the encoded digital signal for transmission to the high definition digital display; wherein said processing of the multimedia signal is configured for a maximum throughput rate of at least 2 Gb/s.

12. The cellular phone of claim 11, wherein the maximum throughput rate supports transmitting the encoded digital signal to the high definition digital display in real time.

13. The cellular phone of claim 9, wherein the multimedia signal is received through a wireless local area network or a cellular communication network.

14. The cellular phone of claim 8, wherein the high definition digital display is inside a vehicle.

15. An apparatus comprising:
an input interface configured to receive a multimedia signal through a wireless communication,
wherein the multimedia signal is a compressed digital signal;
at least one processing unit configured to perform a processing of the multimedia signal,
wherein the processing of the multimedia signal comprises decompressing the compressed digital signal to a decompressed digital signal,
wherein the processing of the multimedia signal further comprises encoding the decompressed digital signal to produce an encoded digital signal, and
wherein the encoded digital signal comprises a decompressed high definition digital video signal; and
a high definition digital output interface configured to transmit the encoded digital signal to a high definition digital display;
wherein the apparatus is configured to receive power through a cable during the processing of the multimedia signal; and
wherein the apparatus is configured to receive the power while the encoded digital signal is transmitted to the high definition digital display.

16. The apparatus of claim 15, wherein the high definition digital output interface is a high definition multimedia interface; and the wireless communication is a wireless local area network communication.

17. The apparatus of claim 16, wherein the apparatus is configured to receive the power from the high definition digital display through the cable during the processing of the multimedia signal to provide power for the processing of the multimedia signal such that charging for power while the apparatus is inactive is avoided.

18. The apparatus of claim 15, wherein the apparatus is configured to receive the power during the processing of the multimedia signal to provide power for the processing of the multimedia signal; wherein the high definition digital output interface is a high definition multimedia interface; wherein the wireless communication is a wireless local area network communication; wherein the apparatus is an intermediate device between a mobile terminal and the high definition digital display; wherein the multimedia signal is received from the mobile terminal through the wireless local area network; and wherein the mobile terminal is a cellular phone or a personal digital assistant (PDA).

19. The cellular phone comprising: an input interface configured to receive a multimedia signal appropriate for displaying a multimedia content on the cellular phone, wherein the multimedia signal is a compressed digital signal; at least one processing unit configured to perform a processing of the multimedia signal, wherein the processing of the multimedia signal comprises decompressing the compressed digital signal to a decompressed digital signal, wherein the processing of the multimedia signal further comprises encoding the decompressed digital signal to produce an encoded digital signal, and wherein the encoded digital signal comprises a compressed high definition digital video signal and the compressed high definition digital video signal is transmitted to a high definition digital display through a wireless communication, wherein the cellular phone is configured to receive power during the processing of the multimedia signal; and wherein the cellular phone is configured to receive the power while the encoded digital signal is transmitted.

20. The cellular phone of claim 19, wherein the cellular phone is configured to receive the power during the processing of the multimedia signal to avoid exhaustion of an internal battery power supply of the cellular phone.

21. The cellular phone of claim 20, wherein the cellular phone is configured to receive the power from the high definition digital display through a cable.

22. The cellular phone of claim 21 further comprising a decoder, wherein the decoder is configured to perform said decompressing the compressed digital signal to the decompressed digital signal; and wherein the cellular phone further comprises an encoder, wherein the encoder is configured to perform said encoding the decompressed digital signal to produce the encoded digital signal for transmission to the high definition digital display.

23. The cellular phone of claim 22 wherein the cellular phone is configured to receive the power during the processing of the multimedia signal to provide power for the processing of the multimedia signal.

24. The cellular phone of claim 23, wherein the cellular phone is configured to receive the power during the processing of the multimedia signal to provide power for the processing of the multimedia signal and to charge the internal battery of the cellular phone during the processing of the multimedia signal such that charging for power while the cellular phone is inactive is avoided.

25. The cellular phone of claim 24, wherein the wireless communication is an IP (Internet Protocol) address based network communication.

26. The cellular phone of claim 22, wherein the multimedia signal is received from one of a wireless local area network and a cellular communication network; and wherein the multimedia content is one or more of the following: a video game, GPS, a video on demand, a 3D image, a high definition television (HDTV), a video, and a video conference.

27. The cellular phone of claim 22, wherein the high definition digital display is inside a vehicle.

28. The cellular phone of claim 22, wherein the high definition digital display is a television.

29. The cellular phone of claim 22, wherein the wireless communication is a Transmission Control Protocol (TCP) based network communication.

30. The cellular phone of claim 22, wherein the wireless communication output interface is configured to directly transmit the encoded digital signal to the high definition digital display through a wireless network communication.

31. The cellular phone of claim 22, wherein the compressed high definition digital video signal is an H.264 format signal.

32. The cellular phone of claim 20, wherein the cellular phone is configured to receive the power during the processing of the multimedia signal to provide power for the processing of the multimedia signal and to charge the internal battery of the cellular phone during the processing of the multimedia signal.

33. The cellular phone of claim 19, wherein the cellular phone is configured to receive the power during the processing of the multimedia signal to contribute power for the processing of the multimedia signal.

34. The cellular phone of claim 19, wherein the cellular phone is configured to receive the power through a cable during the processing of the multimedia signal to provide power for the processing of the multimedia signal and to charge the internal battery of the cellular phone during the processing of the multimedia signal.

35. The cellular phone of claim 34, wherein the wireless communication is a Transmission Control Protocol (TCP) based network communication.

36. The cellular phone of claim 35, wherein the encoded digital signal is directly transmitted to the high definition digital display through a wireless network communication.

37. The cellular phone of claim 34, wherein the cellular phone is configured to receive the power from the high definition digital display through a cable.

38. The cellular phone of claim 34, wherein the compressed high definition digital video signal is an H.264 format signal.

* * * * *